United States Patent [19]

North

[11] 4,212,635
[45] Jul. 15, 1980

[54] PROCESS AND APPARATUS FOR PRODUCING CELLULATED VITREOUS REFRACTORY MATERIAL IN PRESCRIBED SHAPES AND PRODUCTS THEREFROM

[76] Inventor: John W. North, 3467 Pierce Dr., NE., Chamblee, Ga. 30341

[21] Appl. No.: 913,395

[22] Filed: Jun. 7, 1978

Related U.S. Application Data

[63] Continuation-in-part of Ser. No. 888,507, Mar. 20, 1978.

[51] Int. Cl.² ............................................. F27D 3/00
[52] U.S. Cl. ................................... 432/239; 432/121; 432/128; 432/148
[58] Field of Search ............... 432/121, 126, 128, 132, 432/148, 239; 264/43

[56] References Cited

U.S. PATENT DOCUMENTS

| 1,723,006 | 8/1929 | Bennett | 432/132 |
| 1,850,221 | 3/1932 | Wyatt et al. | 264/48 X |
| 2,251,150 | 7/1941 | Merkel | 432/132 |
| 3,473,904 | 10/1969 | Kraemer et al. | 264/43 |
| 4,013,403 | 3/1977 | Petrus | 432/239 |

*Primary Examiner*—John J. Camby
*Attorney, Agent, or Firm*—Newton, Hopkins & Ormsby

[57] ABSTRACT

The apparatus includes a plurality of extruders which feed parallel streams or ribbons of raw material or charge along rollers through successive chambers in a kiln and through an annealing lehr to zones where the material is cut. The surfaces of the raw material are coated on three sides with a parting or releasing agent and, on the side to be exposed, with a glaze or engobe, or left uncoated.

The firing chamber of the kiln has opposed rows of fuel burners on the sides directed toward ports on the other side and refractory rollers which protrude through the side walls and are supported on circumferentially spaced wheels. Wheels between adjacent ends synchronize rotation of the rollers. Manifolds feed the stack gases from the firing chamber into the preheating chamber.

The process includes using charges which are either a mixture of a small amount of soluble carbonaceous material and water to adjust the carbon and moisture content of the clay or silica with carbonaceous material and water. If the charge is clay, it is then extruded as ribbons, coated with releasing agent and glaze or engobe, then dried, preheated, sintered, fired at above about 2000° F. and annealed. Cellulated vitreous clay product results which is cut into rectangular blocks. If the charge is silica, no annealing is required and normally a glaze formed by silica sand may be applied to a surface thereof. The silica charge is produced by processing simultaneously the silica charge and a material to form a plate rather than being extruded, successive plates being passed through the kiln to cellulate and vertrify. Consumable, sectional trays are also disclosed.

11 Claims, 27 Drawing Figures

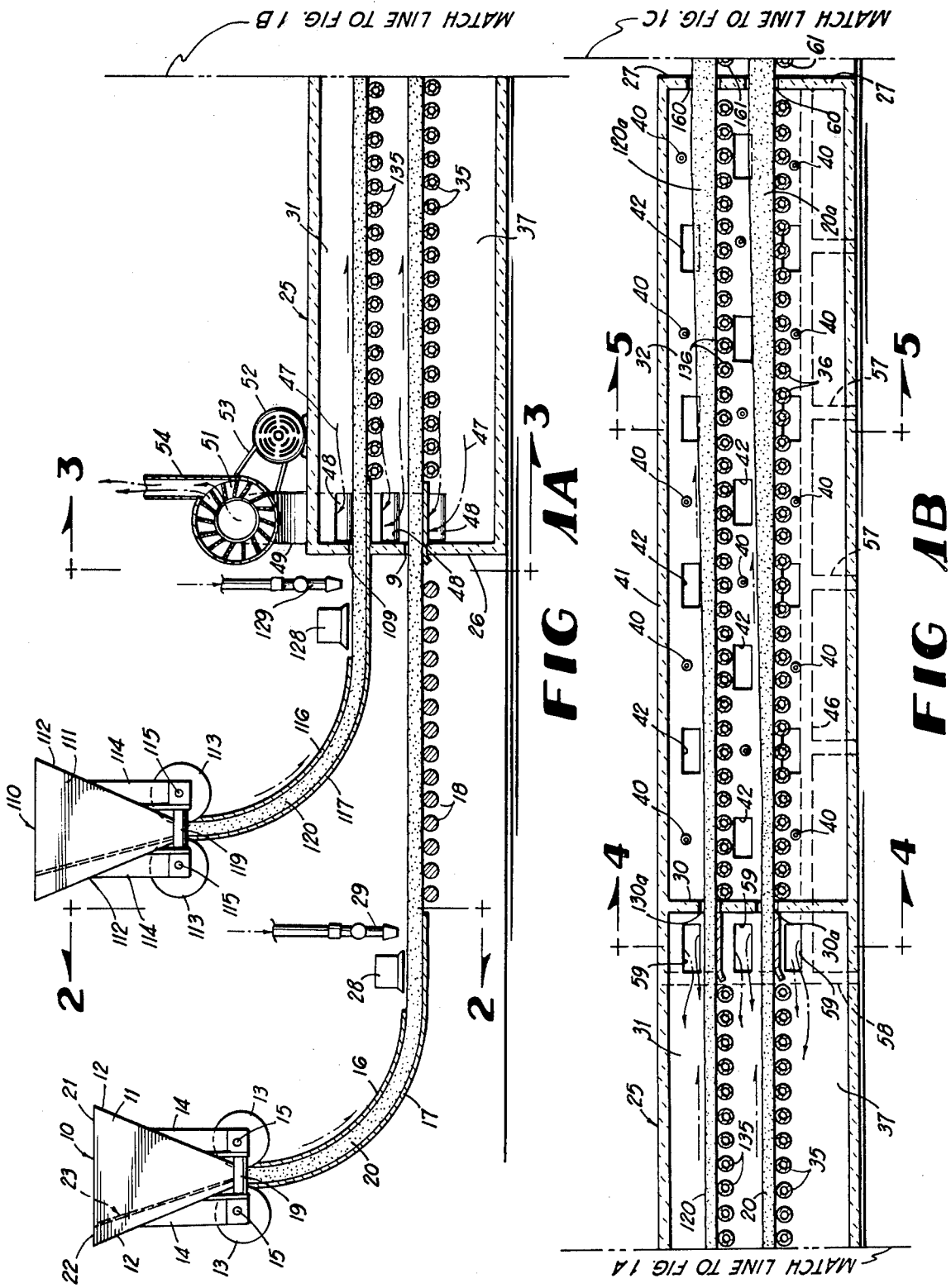

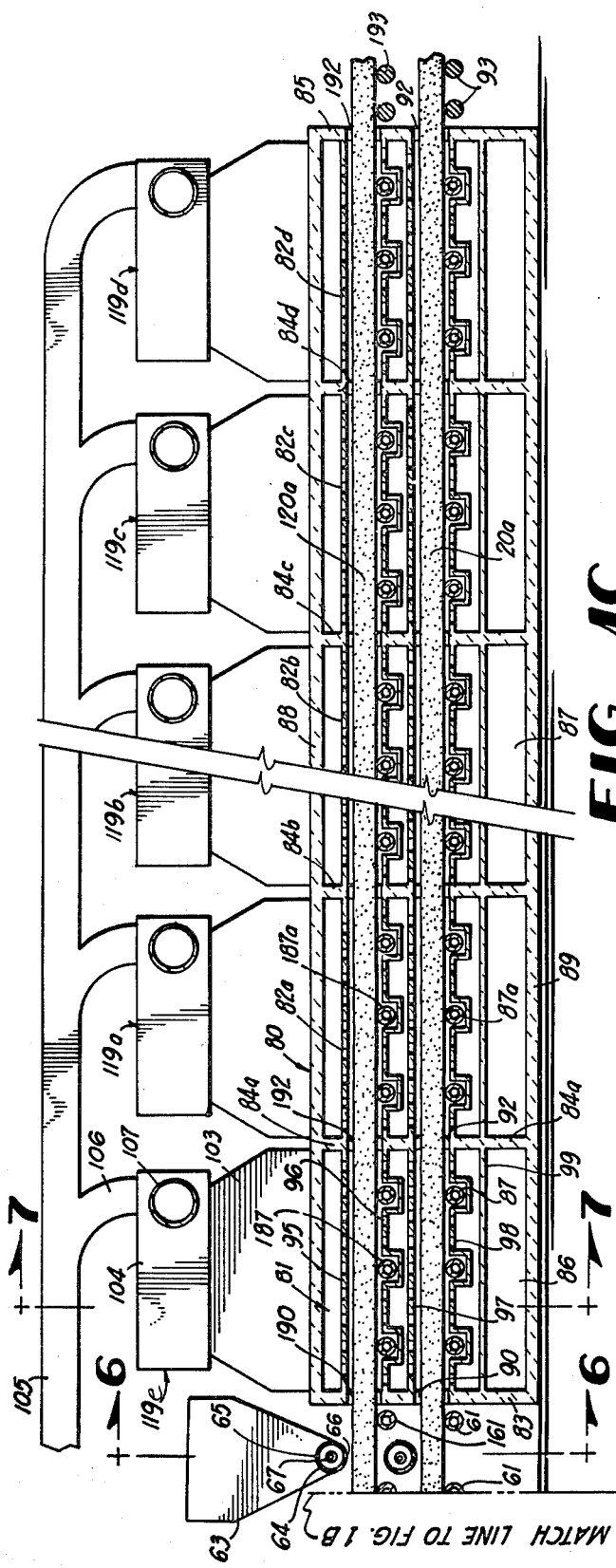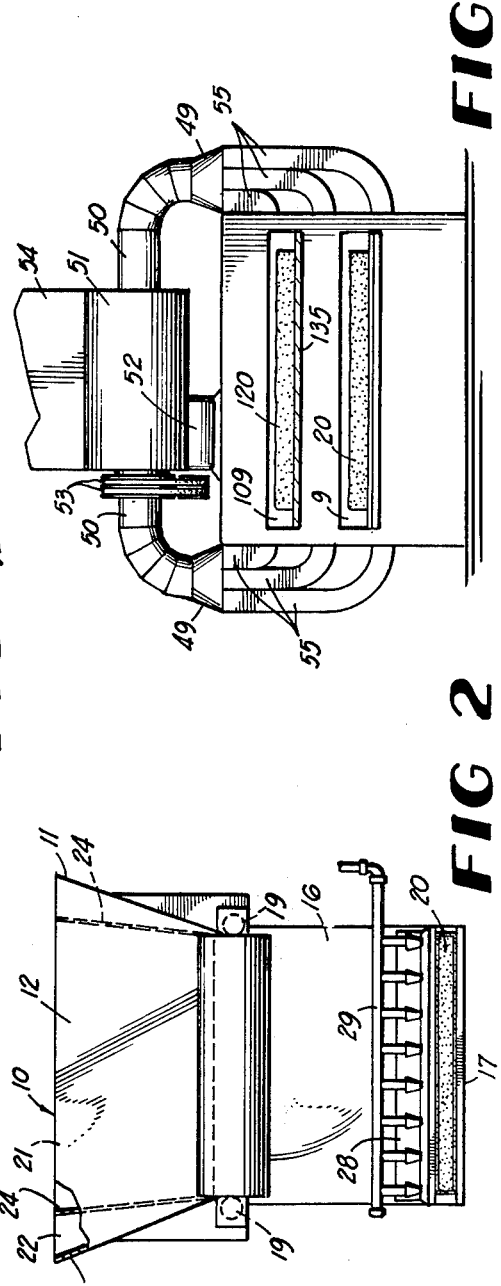

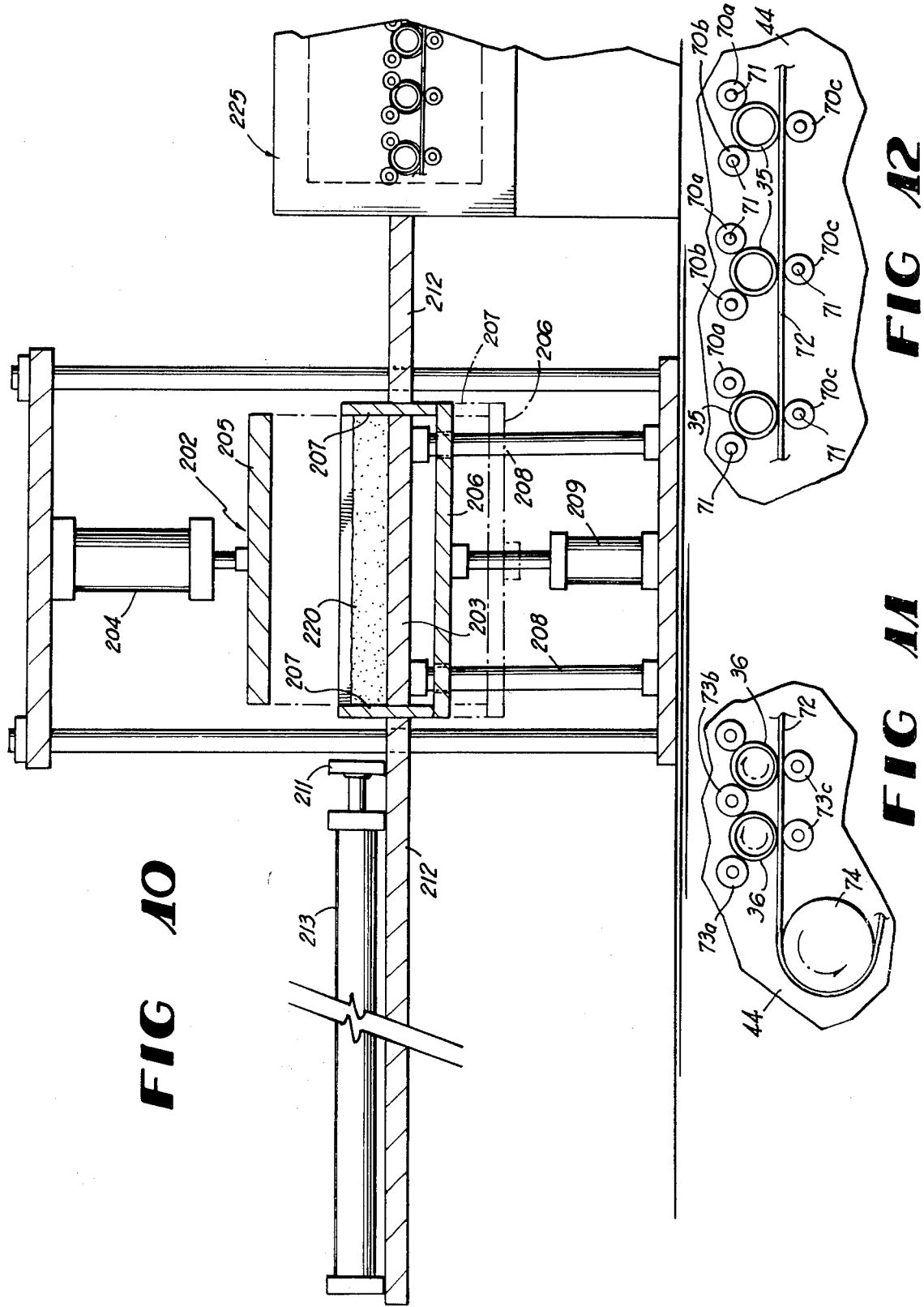

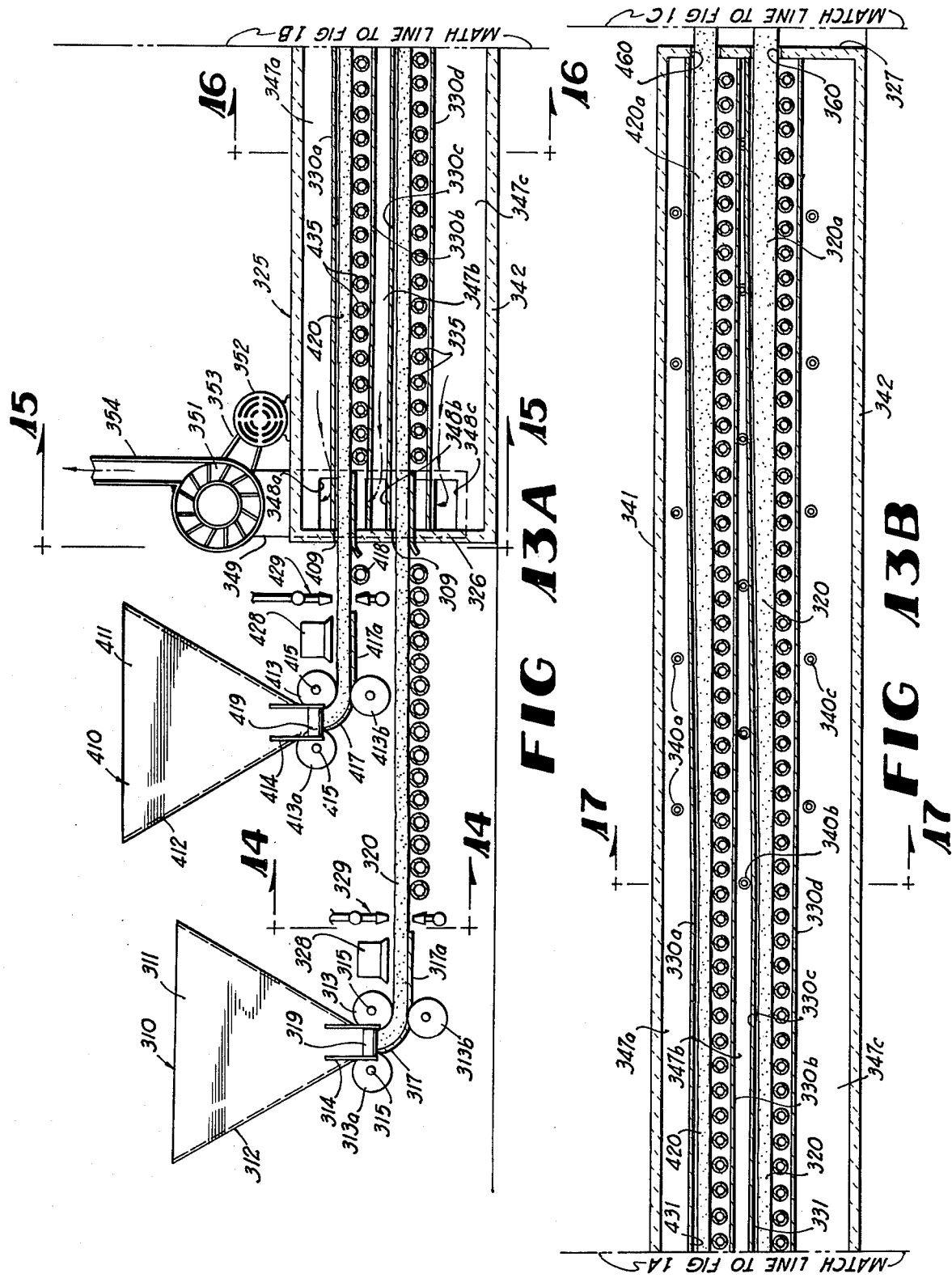

PROCESS AND APPARATUS FOR PRODUCING CELLULATED VITREOUS REFRACTORY MATERIAL IN PRESCRIBED SHAPES AND PRODUCTS THEREFROM

REFERENCE TO RELATED APPLICATION

This application is a continuation-in-part of my co-pending application Ser. No. 888,507, filed Mar. 20, 1978.

BACKGROUND OF THE INVENTION

1. Field of the Invention

This invention relates to the production of cellular vitreous slabs or shapes having a substantial part of the volume composed of gases enclosed in the cells, and is particularly concerned with the process and apparatus to produce cellular vitreous refractory material in prescribed shapes and products therefrom of lighter densities than conventional brick or tile, and more impermeable.

2. Description of the Prior Art

There is one commercial producer of cellular glass blocks who uses a process in which powdered or pulverized glass is the main raw material. The fine particle size glass powder is mixed with two chemical agents which react to form gas at a temperature above the point where the glass sinters to seal in the gas. The same corporation owns U.S. Pat. No. 2,890,127 which discloses using powdered quartzite as the charge and discrete carbon particles or silicon carbide, the carbon reacting with $SiO_2$ to produce the foaming gas. It also owns U.S. Pat. No. 2,890,126 which discloses supporting the charge by graphite slabs and the addition of compounds, such as feldspar, to the mixture of U.S. Pat. No. 2,890,127 to decrease viscosity and improve sintering and cellulation. Commercial production was maintained intermittently for several years and then abandoned. These two patents pointed out the radically improved properties obtained when the glass blocks are of almost pure silica glass.

The kiln for the above described commerical process was made of graphite slabs which acted as resistance heaters. The charge was carried in graphite pans pushed in a train through the kiln. The process was not successful, as I understand the matter, because it was too expensive and the graphite slabs and pans would not last. My process avoids expensive grinding to fine particle size and the use of expensive high quality graphite for kiln parts and charge pans.

Various patents describe the foaming of various minerals to avoid the expense of first making powdered glass. None have resulted in a sustained commercial production of a slab or shape; however, Dow Chemical did produce "market development" quantities of foamed vitreous clay blocks for several years, using clay as a raw material. The prior art of bloating clay into lumps of cellulated material gave Dow the hot lumps which they pressed and thus welded into blocks. (U.S. Pat. No. 3,056,184).

For centuries, prescribed shapes of roof tile, wall tile, floor tile, brick, and various ceramic bodies, such as flower pots, china and the like, have been produced by pressing a mixture of clay and water then drying and sintering the same. Such products as bricks have been produced by extruding the clay mixtures so as to compact the charge into quite dense masses. "Dry" pressing of the clay mixture at high pressure has also been employed, extensively.

Such dense clay mixtures produced by dry pressing or damp pressing have usually contained from about 5% to 8% moisture and have been subjected to from about 1000 psi to about 5000 psi. In the prior art extrusion of clay mixtures, the moisture content of the clay mixture is usually higher, namely in the neighborhood of from 15% to 20%, however, very substantial pressure is still necessary.

Each of the resulting dense mixtures must be dried quite slowly over an extended period of time so as to permit the gradual migration of the moisture through the clay. If such a procedure is not followed, the clay may crack or explode during drying. The resulting sintered clay is quite dense and holds its original shape without cracking or crazing. The sintering is at a temperature below the fusion temperature of the clay which is employed. I use a mix which is low in moisture and is pressed at low pressures. This enables the rapid heating of the charge which may crack on sintering but such cracks are later healed.

In the past, the cellulation of clay materials have been carried out. For example, Ford, In U.S. Pat. No. 2,485,724 taught that by using flux, low temperature foaming of a special Albany slip clay could be carried out using an oxygen containing agent and carbon in the form of carbon black. Ford also taught that urea, sugar, dextrose or molasses could be substituted for the carbon black to produce bodies having densities of from 10 to 20 lbs. per cubic foot. The firing temperature was in the neighborhood of 1500° F. to 1800° F.

In my U.S. Pat. No. 3,967,970 I produced a bloated clay by firing at about 2100° F. to 2300° F. of a mixture of clay, sugar, sodium or potassium hydroxide and water. In example 4 of that patent, I substituted trisodium phosphate for the sodium hydroxide.

The process of the present invention eliminates the expense, trouble and hazards of using a flux and has thus produced a foamed product having a higher melting point and more resistant to water and chemical agents.

U.S. Pat. No. 2,337,672 discloses the manufacturers of multicellular glass by heating a charge from glass, oxide of arsenic, zinc or cadmium and carbon powder to produce a reaction between the oxide and the carbon.

Other less pertinent U.S. patents relating to bloating of ceramic material include the following:

| | |
|---|---|
| 3,174,870 | 3,150,988 |
| 3,666,506 | 2,880,099 |
| 3,536,503 | 2,564,978 |
| 3,307,957 | 2,670,299 |

None of the prior art patents discussed above disclose any practical means for producing a foamed mineral block or plate quickly and economically.

Accordingly, it is an object of the present invention to provide an apparatus for and method of producing a foamed mineral article quickly, efficiently and at a low cost.

Another object of the present invention is to provide a foamed mineral article which is highly insulative and light weight and yet is resistant to aging, corrosion and water absorption.

Another object of the present invention is to provide a process and apparatus for producing a foamed mineral material and the material, itself, which has a high structural strength capable of forming load bearing walls and roof decks with wide spaced supports and can be produced in large sheets.

Other objects features and advantages of the present invention will become apparent from the following detailed description.

SUMMARY OF THE INVENTION

Briefly described, the process of the present invention employs low pressure for the compacting of a clay, carbonaceous material and moisture, mixture charge followed by rapid heating to dry the clay charge and the progressive firing of the shaped charge, above the fusion temperature, on rollers without the necessity of carrier plates to produce a preshaped cellular vitreous impervious lightweight refractory. The movement of the charge through the firing zone is slow; however, no appreciable sagging of the ribbons of charge take place, due to the high viscosity of the molten clay involved. Any cracks occuring during drying or preheating are healed by the bloating of the clay.

Essentially the same procedure is followed for producing a preshaped foamed fused silica product employing as a charge, finely divided silica and a carbonaceous foaming agent.

When a clay or silica ribbon is prepared to be passed over the rollers of the apparatus, a parting or releasing agent is in some cases applied to the bottom and perhaps sides of the ribbon.

The apparatus of the present invention includes a plurality of juxtaposed sets of damp pressing rolls, each of which is supplied from a hopper with a mixture of clay and/or shale whose carbonaceous material content and moisture content has been adjusted. Each set of rolls also co-extrudes a releasing or parting agent around the sides and bottom of the ribbon of clay raw material which is extruded. Nozzles introduce glaze or engobe to the top of the ribbon.

The force of the rolls feed the ribbons along parallel horizontal vertically spaced paths to the first warming or preheating chamber of the kiln and, thence, into the firing chamber along the upper surfaces of rollers. The ends of the rollers protrude outwardly of the walls of the kiln, the end portions being supported on circumferentially spaced idler wheels and can be rotated simultaneously by a common belt.

Fuel and air are supplied, via headers, to the burners disposed in staggered relationship in opposed parallel rows along the sides of the kiln in the firing chamber. Exhaust ports are disposed opposite to the nozzles, the ports leading to manifolds which feed to the exit portion of the preheating chamber of the kiln. Exhaust blowers discharge the flue gases from the entrance portion of the preheating chamber. In the preheating chamber, sintering of the ribbons usually takes place.

Foaming of the sintered clay ribbons takes place at above about 2000° F. in the firing chamber as the ribbons are progressively moved along the rollers in the firing chamber.

The ribbons, emerging from the exit of the firing chamber, are in the form of impervious cellulated refractory streams and are passed into an annealing lehr where the temperature thereof is rapidly reduced to annealing temperature and then annealed. Thence, these products are fed to conveyors where they are cut into rectangular blocks.

In another embodiment of the invention, a charge of silica, carbonaceous material and water is produced in a heated low pressure press. A plate, formed from aluminum foil or other release agent and a layer of pitch and coke or coal is produced on the lower surface of the charge, at the same time the charge is being pressed.

This compacted silica charge, on its plate, is fed through the kiln end-to-end and is preheated and foamed in the manner previously described for clay. Cellular fused silica blocks are formed.

The third embodiment includes two stage extruders, each having three feed rollers to feed a charge as a ribbon from hopper horizontally to the kiln. The parting agent is sprayed from below onto the ribbon and the glaze or engobe from above. The kiln of the third embodiment has muffle plates to produce vertically spaced chambers above and below the ribbons, the chambers exhausting into the drying or preheating zone of the kiln.

In the fourth embodiment, the kiln is depicted as ram fed with preassembled pans containing charges of green or raw silica. The sections of the pan are either preassembled to receive a hand rammed charge or respectively provided with pressed charges which upon melting form a monolithic or unitary fused product.

BRIEF DESCRIPTION OF THE DRAWINGS

FIG. 1A is a schematic vertical sectional view of one embodiment of an apparatus for producing cellulated refractory material according to the present invention, the apparatus being shown as processing clay charges;

FIG. 1B is a continuation of the view of the apparatus shown in FIG. 1A;

FIG. 1C is a continuation of the view of FIG. 1B;

FIG. 2 is a vertical sectional view taken substantially along line 2—2 in FIG. 1A;

FIG. 3 is a vertical sectional view taken substantially along line 3—3 in FIG. 1A;

FIG. 10 is a vertical sectional view of the front portion of a second embodiment of the present invention showing a press assembly for forming successive rectangular charges to be fed to the kiln;

FIG. 11 is an enlarged fragmentary side elevational view showing the drive for the horizontal feed rollers of the kiln of FIGS. 1A; 1B and 1C;

FIG. 12 is a view similar to FIG. 11 but showing the drive for those feed rollers which are spaced apart more than the rollers of FIG. 11;

FIG. 13A is a vertical sectional view similar to FIG. 1A but showing a third embodiment of apparatus for producing cellulated refractory material;

FIG. 13B is a continuation of the view shown in FIG. 13A;

DESCRIPTION OF THE PREFERRED EMBODIMENTS

Figure 4:
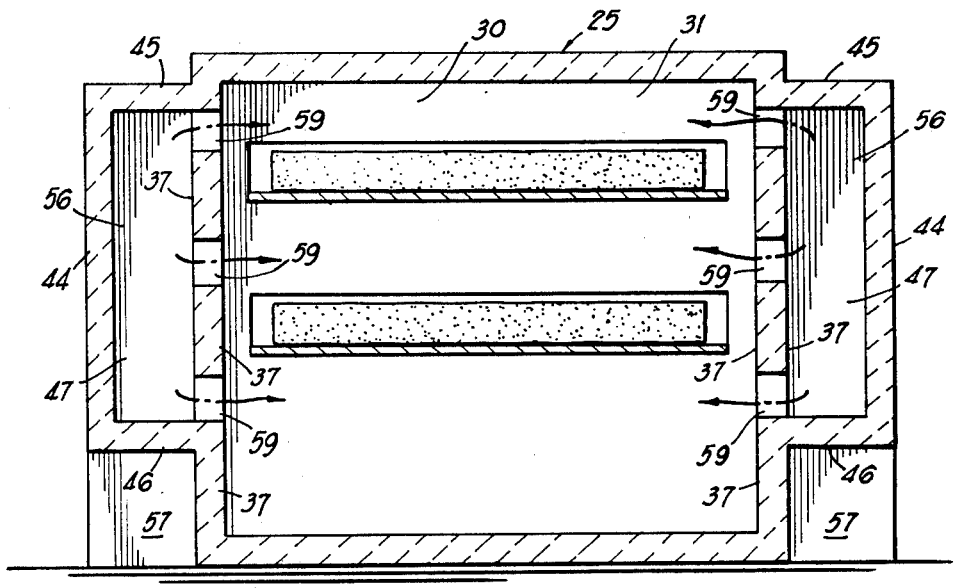
FIG. 4 is a vertical sectional view taken substantially along line 4—4 in FIG. 1B.

Referring now in detail to the embodiments chosen for the purpose of illustrating the apparatus of the present invention, numeral 10 in FIG. 1 denotes a vertically disposed hopper having parallel triangular end walls 11 joined by downwardly converging side walls 12 which terminate in a rectangular opening at the bottom portion of the hopper. A set of damp pressing rollers is carried at the opening of the hopper 10. This set includes a pair of opposed compression rollers 13 carried by brackets 14 for rotation about spaced, parallel, horizontally disposed, axes or axles 15 rotated in opposite directions for compacting and feeding the material or charge contained in the hopper 10 into a curved conduit 16 having a rectangular cross sectional area. End rollers 19 disposed along axes or axles perpendicular to axles 15 cooperate with rollers 13 for compacting and driving the material into conduit 16.

The rollers 13 and 19 thus extrude a rectangular ribbon 20 of the raw material or charge in a vertical downward path into the upper end portion of the conduit 16. The curved contour of the conduit 16 progressively alters the course of the ribbon 20 from a vertical path to a horizontal path, the lower end portion 17 of the conduit 16 protruding in a horizontal direction outwardly from the conduit 16 to provide a slide plate along which the ribbon 20 progressively moves. The upper surface of the slide plate 17 is aligned with the upper periphery of a plurality of parallel disposed, infeed, conveyor rollers 18 which are formed either of steel or ceramic material. The infeed rollers 18 are rotated in synchronization so as to form a live deck for the conveyance of the ribbon 20 into the entrance port 9 in the front or entrance end 26 of a kiln, denoted generally by the numeral 25. Thus, the ribbon 20 forms a continuous charge of rectangular cross section which is moved through the kiln 25 from the entrance end 26 to the exit end 27 of the kiln 25.

As seen in FIG. 1A the hopper 10 is compartmented to provide a main charge receiving compartment 21 and a releasing or parting agent compartment 22. A U-shaped partition 23 separates the two compartments 21 and 22. In more detail, partition 23 includes opposed truncated, triangular shaped, downwardly converging, parallel, side walls 24, joined by their forward edges to the side walls 11. The rear edges of the side walls 24 are respectively joined to the edges of a transverse rectangular partition plate 26a. Thus, a U shaped secondary or parting agent compartment 22 is defined by a portion of hopper 10 and the partition 23 which also surrounds three sides of the main charge receiving chamber 21.

A mixture consisting of clayey material, water and carbonaceous material (adjusted as to carbonaceous material and moisture) after being granulated and thoroughly mixed, is fed into the main compartment 21. A parting or releasing agent is fed into the compartment 22. This parting or releasing agent can be any of a variety of agents which are employed for preventing sticking of surfaces in a mold. I prefer, in order to keep the rollers 35 and 36 clean, to use a damp mixture of fire clay and fire clay grog which has the double function of separating the extruded ribbon 20 of clayey material from the rollers in the kiln 25 and also confine the width of expansion of the ribbon 20, transversely. Furthermore, the parting or releasing agent around the sides and bottom of the ribbon 20 may be made strong enough to resist breaking off in case of a sticky spot on the rollers 35 and 36 caused by an inadvertent contamination.

An alternative parting agent mixture of silica sand bonded with moist clay to about 8 to 20% clay may be used, to give adequate bond to substantially hold the parting layer through the green and dry stages. This would give a stronger bond upon firing, except that the sudden expansion of the sand grains at about 1073° F. largely breaks the bond. Then in case of a sticky spot of molten material on the rollers, the sand grains are given up to the spot until the stickiness is covered.

In case the charge is silica or clay with a fusion temperature above about 2900° F., the parting agent should be pitch bonded carbonaceous material such as coke or coal.

When a pitch or tar bonded coke or coal is to be used as the parting agent, it is preferable to employ a low pressure rectangular press 202 of FIG. 10 in which the platen 203 of the press 202 receives the parting as a first layer and the clay or silica charge is loaded, thereover.

In more detail, the press 202 includes a vertically disposed double acting hydraulic or air cylinder 204, the piston rod of which reciprocates in a vertical path a rectangular flat metal press plate 205.

The heated rectangular platen 203 is disposed in a fixed position in registry below the plate 205. Below the plate 203 is a vertically moveable border supporting plate 206 which carries an upstanding border member 207 surrounding the edge portions of the platen 203. Legs 208, projecting through holes in the support plate 206, support the platen 203.

A ram 209 reciprocates the plate 206 and hence border member 207 in a vertical path from the position shown in broken lines to the position shown in full lines in FIG. 10.

Mounted for horizontal movement across platen 203 is a ram plate 211 carried by the piston rod of a horizontally disposed ram 213. A slide plate 213 on the side of platen 203 provides a deck over which successive charges 220 are fed from press 202 into the oven or kiln 225 for processing.

In operation the plate 205 is retracted and the border member 207 raised around the platen 206. The charge, which may consist of an aluminum sheet, a carbonaceous material and a binder on the sheet as a thin layer, and the silica charge thereover, is placed in the border member 207 on the platen 203. The material is then pressed by plate 205 through actuation of the press cylinder 204 and then the plate 205 is retracted. Thereafter, the border member 207 is stripped downwardly and the ram 213 actuated to move ram plate 211 over the platen 203 and urge charge 220 into kiln 225. Successive charges 220 form a ribbon entering kiln 225 where it is then treated in the same manner as ribbon 20 in kiln 25.

The low pressure press 202 is normally used to exert a pressure of from about 50 psi to about 1000 psi and can be used in place of the rollers 13 and 19 for forming clay charges with or without a parting agent along the bottom surface or bottom and side surfaces of the clay charge.

Disposed above the slide plate 17 is a drying heater 28 the function of which is to dry the upper surface of ribbon 20 as it emerges from the conduit 16 in a horizontal path. The heater 28 can, if desired, be an electrical resistance heater or a gas heater or any of a variety of heaters which would supply sufficient heat for simply drying the upper surface of the ribbon 20. Rearwardly of the heater 28, along the path of the ribbon 20, is a color coating nozzle assembly 29 which extends transversely across and above the path of travel of the ribbon 20. The function of this nozzle assembly 29 is to feed engobes or glaze onto the upper surface of the ribbon 20, after the surface has been dried. Of course, the color coating may be omitted when desired.

Thus, at this stage, the ribbon 20 is travelling in a horizontal path and has a releasing agent along its bottom and side surfaces and a glaze or engobe along its upper surface. A second hopper 110 which is identical to the hopper 10 is disposed adjacent to hopper 10 for providing a second ribbon 120 for entry into the kiln 25. This second hopper 110 includes rectangular downwardly converging side walls 112 and truncated triangular walls 111 forming a rectangular downwardly converging hopper. The hopper 110 also includes opposed feed rollers 112 rotating on axles 115 and supported by brackets 114. Furthermore, the hopper 110 includes side rollers 119 which cooperate with the feed rollers 113 in creating a downwardly directed stream or ribbon 120 which is received within the curved conduit 116. Conduit 116 gradually alters the path of the ribbon 120 from a vertical downwardly directed path into a horizontally directed path. Like the hopper 10 the hopper 110 includes a partition 123 so that the ribbon 120 is provided with a releasing agent along its bottom surface and side surfaces. Furthermmore, the upper surface of the ribbon 120 as it emerges in a horizontal path is supported by a slide plate 117 and is heated by a heater 128 adjacent to its upper surface. A glaze applying nozzle assembly 129 is provided for spraying glaze onto the heated and dried, upper surface of the ribbon 120. Thence, the ribbon 120 enters the kiln 25 through a rectangular opening or port 109 spaced vertically above the rectangular entrance port 9 for the ribbon 20. Thus, the ribbons 20 and 120 are disposed and go through the kiln 25 from the entrance end 26 to the exit end 27 along parallel horizontal vertically spaced paths.

In more detail, the kiln 25 or at least the lining of the kiln, is formed of refractory material. It is generally rectangular in shape throughout its length. In the central portion of the kiln 25 is a vertical partition 30 which separates the interior of the kiln 25 into a drying and preheating chamber 31 and a firing chamber 32. In other words, the chambers 31 and 32 are disposed in tandem along the longitudinal path which is traveled by the ribbons 20 and 120. The partition 30 has two vertically spaced openings or ports 30a and 130a through which the ribbons 20 and 120 pass. Ports 9, 30a and 60 are horizontally aligned ports; 109, 130a and 160 are in horizontal alignment above ports 9, 30a and 60.

All burners 40 heating the kiln 25 are preferably in the firing chamber 32, the drying and preheating chamber 31 receiving the exhaust, flue or stack gases from the firing chamber 32.

As pointed out above, the kiln 25 and particularly the firing zone or chamber 32, is made of or lined with refractory material which will withstand temperatures in the neighborhood of 2300° F. and up to 3300° F. in some instances. Chamber 31 is less critical in that it is always at a lower temperature than chamber 32, but refractory material should be used for lining this chamber 31. The rollers 35 and 135 in the preheating chamber 31 and the rollers 36 and 136 in the firing chamber 32 are of suitable refractory material, such as high alumina or fused silica. The rollers 35 and 36 are disposed along a horizontal path and extend transversely of the kiln 25, the ends of each rollers 35 and 36 protruding outwardly through appropriate holes on opposite inner side walls 37 and 38 and outer side walls of the kiln 25.

The upper peripheries of the rollers 35 and the upper peripheries of the rollers 36 are disposed along a common horizontal plane and are adapted to receive and support by its lower surface, the ribbon 20. In like fashion, the rollers 135 and 136 protrude outwardly through appropriate holes in the side walls 37 and 38 and provide upper peripheries which are in a common plane and receive the bottom surface of the ribbon 120 for supporting the same. The plane of rollers 135 and 136 is parallel to and above the plane of rollers 35 and 36.

While I have utilized a kiln 25 with two paths of travel for the raw material or ribbons 20 and 120 through the kiln 25 being fed respectively by rollers 13, 19, 18, 113 and 119, the number of streams of raw material can be multiplied, as desired, through a duplication of the systems here disclosed. Thus, additional lines of hopper 10, 110, rollers 13, 113, 15, 115, etc. and a corresponding number of rollers 35, 36 and 135, 136, may be utilized in a single kiln, if desired.

For providing a means for heating the firing chamber 32 I have provided a plurality of spaced laterally directed fuel i.e. oil or gas, combustion nozzles or burners 40 which protrude through the walls 38 defining the chamber 32. The nozzles 40 on one side of the chamber 32 are staggered with respect to the nozzles 40 on the other side wall 38 of the chamber 32. Furthermore, there are horizontal rows of such staggered nozzles 40 below the row of rollers 36, and between the row of rollers 36 and the rollers 136, and between the roof 41 and the row of rollers 136. Thus, flames from the nozzles 40 are introduced laterally in alternate directions both over and under the ribbons 20 and 120.

Respectively, transversely opposite to nozzles 40 are the gas discharge ports 42 in the side walls 38. The discharge ports 42 are, thus, arranged in horizontal rows corresponding to the rows of nozzles 40 and are also in staggered relationship with respect to the transversely disposed ports 42. It is now seen that each side wall 38 has three vertically spaced rows in which there is alternately a discharge port 42 and a nozzle 40 equally spaced, longitudinally. Each nozzle 40 directs its flame transversely across the firing chamber 32 so that a substantial amount of combustion gases travel through the opposed port 42 and out of the chamber 32.

With the nozzles 40 being in staggered relationship transversely in each horizontal row, there are generated rotary flows of gases alternately clockwise and counterclockwise over and below the ribbons 20 and 120.

Each nozzle 40 is disposed longitudinally equidistant between two adjacent rollers 36 and 136 and protrudes through and is supported by the side wall 38. Combustible gas, such as natural gas is supplied from a gas header 43 through individual branch lines 43a to the nozzles 40. An air header 47 supplies air under pressure through lines 44a so as to present air for mixture with the gas at the nozzles 40. The headers 43 and 44 are disposed on opposite sides 48 of the firing chamber 32. A similar arrangement may be made for burning oil or other fuel.

Figure 5:
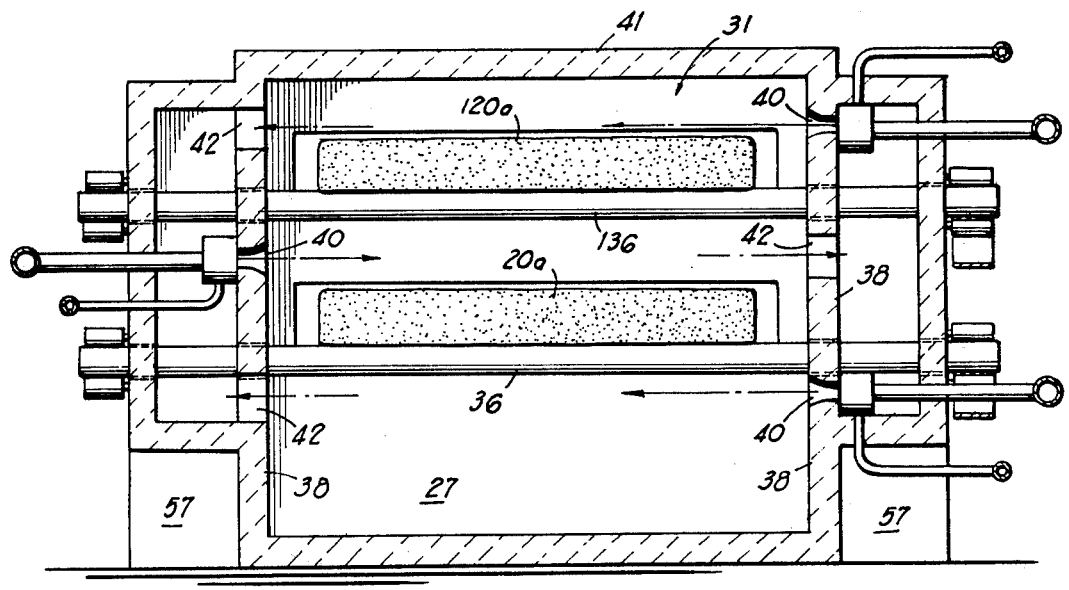
FIG. 5 is a vertical sectional view taken substantially along line 5—5 in FIG. 1B.
Figure 6:
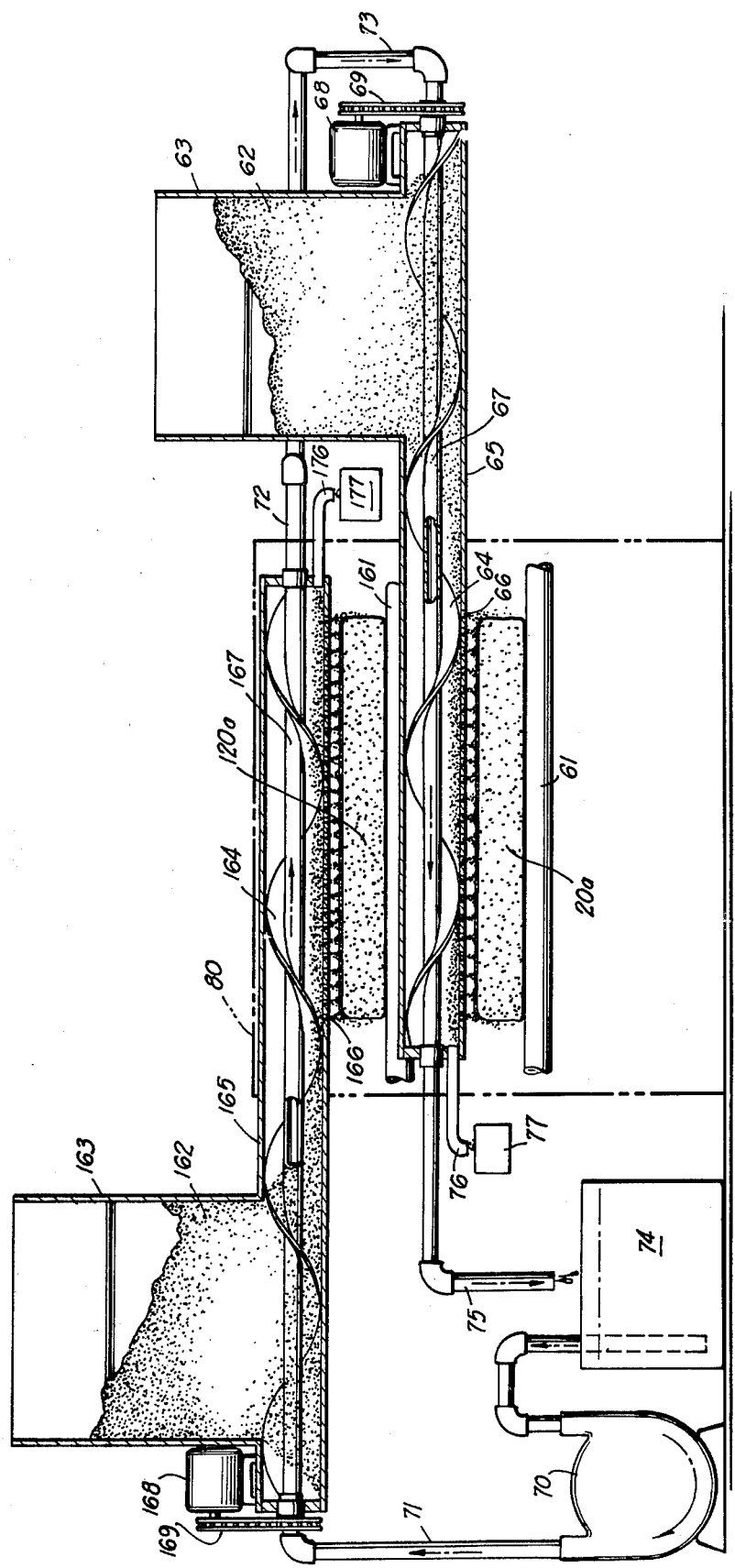
FIG. 6 is a vertical sectional view taken substantially along line 6—6 in FIG. 1C.

As seen best in FIG. 5, the kiln 25 is provided with outer walls 44 which are spaced outwardly of and parallel to inner side walls 38. Upper and lower horizontal walls 45 and 46 join the upper and lower edges of walls 44 to their respective inner side walls 38 to form horizontally extending channels or passageways 47 on opposite sides of the inner side walls 37. End walls 56 which are parallel to rear end wall 27 closes the downstream ends of channels 47.

The walls 44, 45, 46 define manifolds which enclose all of the exhaust port 42 so that they communicate, on their respective sides, with the horizontally extending channels 47. Spaced blocks 57 below walls 46 provide support for these manifolds.

The walls 44, 45, 46 extend in an upstream direction over the opposite side walls 37 of the upstream end portion of the chamber 31 to terminate at end walls 58. Opposed, vertically spaced flue or stack gas, inlet ports 59 are provided in the end portions of side walls 37, as seen in FIG. 1B, so as to communicate with the channels 47, as shown best in FIG. 4. Thus, channels 47 conduct all flue gases from the firing chamber 32 and introduce them laterally through ports 59 on opposite sides of chamber 31 both above and below the ribbons 20 and 120. in the downstream end of chamber 31 and such gases pass in an upstream direction, as indicated by the arrows being received by discharge ports 48 disposed in the walls 37 adjacent the front 26 or entrance end of chamber 31.

The transversely opposed discharge ports 48 communicate with opposed, upwardly extending suction ducts 55 communicating with exhaust manifolds 49 disposed exteriorly of kiln 25 adjacent the walls 37. These exhaust manifolds 49 lead upwardly into an intake duct 50 which is connected to the intake ports of an exhaust blower 51 driven by a motor 52 through belt 53. The fan or blower 51 discharges through a stack 54 to the atmosphere.

Individual controls for nozzles 40 including strategically located pyrometers and valves (not shown) which enable an operator to control the transverse heating zones of the firing chamber 32 so that the heat in the firing chamber 32 may be maintained within quite close tolerances. The transverse flow of these gases, both above and below the moving ribbons 20 and 120 enable the firing chamber 32 to be maintained at an appropriate temperature for progressively firing and foaming or cellulating of successive increments of the clay ribbons 20 and 120, as they move along the firing chamber 32. The proportion of air to fuel is maintained in various zones, as desired, for oxidizing neutral, or reducing conditions.

Thus, the cellulated or expanded vitreous clay, denoted by the numerals 20a and 120a, progressively and continuously emerge through discharge ports 60 and 160 in the rear end 27, onto support rollers 61, 161.

As the cellulated vitreous clay ribbons 20a and 120a emerge from the kiln 25, the upper surfaces thereof can, if desired, be treated with additional surfacing material, such as a dry granular fritted glaze 62. The glaze or coating material 62 is retained in a hopper 63, adjacent one side of kiln 25. The bottom portion of hopper 63 is provided with a transversely extending, hollow, distribution cylinder 65 carrying a horizontally disposed screw conveyor 64. The distribution cylinder 65 communicates at one end with hopper 63 and is provided, at its lower side with a plurality of axially spaced holes 66.

Since the cylinder 65 will be subjected to very substantial heat, it being disposed transversely across the upper portion of the path of travel of the expanded or bloated clay ribbon 20a, a means for cooling both the coating material 62 and the cylinder or trough 65 is provided. This means for cooling includes a hollow central shaft 67 for conveyor 64, through which water under pressure is directed. The shaft 67 and the screw conveyor 64, which is attached to shaft 67, are rotated by a motor 68 and chain drive 69. Water is fed to the shaft 67 by pump 70 through a pipe 71, shaft 167, pipes 72 and 73, from a tank 74. A return line 75 delivers the cooling water back to tank 74.

Shaft 167 is identical to shaft 67 and carries a screw conveyor 64 in a cylinder or trough 165 of a hopper 163 driven by motor 168 and chain 169 for feeding fritted glaze 162 through holes 166 onto the upper surface or ribbons 120a. The cylinder 165 extends transversley over ribbon 120a.

Spouts 76 and 176 on the ends of cylinders 66, 166, feed any excess fritted glaze 62 or 162 to receptacles 77, 177.

By selective operation of the motors 68, 168, fritted glaze 62, 162 is delivered to the hot upper surfaces of ribbons 20a, 120a. The glaze immediately becomes molten to provide a glazed surface thereon.

As pointed out above, the end portions of rollers 35, 36, 135, 136 protrude outwardly through appropriate holes in walls 37, 38, 44, 237, 238, 244 of the kiln 25 and 225. As seen in FIG. 12, the rollers 35, for example, which support the charge prior to sintering and are in the drying and preheating chamber 31, can be spread apart from each other by greater distance than the spacing of the rollers 36. With such greater spacing, each end portion of the rollers 35, outwardly of the kiln is confined by three circumferentially spaced idler wheels 70a, 70b 70c. The idler wheels 70a, 70b, 70c are supported for rotation by stub shafts 71 which project into the outer walls 44. The axis of each lowermost wheel 70c is vertically below the roller 35 which it supports.

A continuous steel belt 72, passing between each wheel 70c and its associated roller 35, to the next and then to the next provides synchronized drive for all rollers 35. The same belt 72 also passes beneath all rollers 36, as seen in FIG. 11, being received between the end portion of each roller 36 and its associated wheel 73c which is there beneath.

Since rollers 36 are closer together, they can share an additional wheel 73b which is between them and rides against the peripheries of the adjacent rollers 36 above the axial plane of such rollers 36. Such wheels 73b aid the belt 72 in synchronizing rotation of rollers 36. The outboard roller 36 has an outer idler wheel 73a circumferentially spaced from wheels 73b and 73c for that roller 36.

Belt 72 passes round appropriate drive or guide rollers 74 outboard of the rollers 35 and 36. A motor (not shown) may drive belt 72. Rollers 135, 136 have a similar drive. Lehr 80 is provided with a similar drive for its rollers. The drives may be on one or both sides of the kiln or lehr to drive one or both end portions of the rollers.

At locations along the path of travel of the ribbons 20, 120, if there is expansion or contraction of the ribbons, it may be found desirable to permit one or several of the rollers, such as rollers 35, 36, 135, 136 to idle. This can easily be accomplished by shifting the appropriate associated wheel or wheels 70c and/or 73c laterally inwardly or outwardly so that they are out of alignment with belt 72.

After the bloating ribbons 20a and 120 emerge from the kiln 25, and after additional glaze 62 has been supplied to the upper surface of the material, if desired, the ribbons 20a and 120a pass into an annealing lehr denoted generally by the numeral 80. The annealing lehr 80, like the kiln 25, is separated into compartments, the first being a cooling chamber 81 and the others annealing chambers 82a, 82b, 82c. The lehr 80 includes a front wall 83, intermediate partitions 84a, 84b, 84c, 84d and a rear wall 85. In addition, it has front side walls 86 and rear side walls 87 as well as a top 88 and a bottom 89.

Rollers 87 and 187 form horizontal conveyors for the ribbons 20a and 120a in the first chamber 81. Rollers 88 and 188 form horizontal conveyors in the second chamber 82. The front wall 83 is provided with ports 90 and 190 through which the respective ribbons 20a and 120a pass into the chamber 81. The partitions 84a, 84b, 84c, 84d are provided with ports, such as ports 91 and 191, through which the ribbons 20a and 120a pass from the chamber 81 into the successive chambers 82a, 82b, 82c, 82d. The rear wall 85 is provided with ports 92 and 192 through which the ribbons 20a and 120a emerge from the lehr 80.

Additional transverse rollers 93 and 193 form horizontal conveyors for the cooled ribbons 20a and 120a which emerge from the lehr 80.

For rapidly cooling the ribbons 20a, 120a in the cooling chamber 81, a forced draft circulating air system 119 is provided. This system 119e includes three transversely extending metal baffles 95, 96, 97 and a bottom plate 98 disposed in the chamber 81. Plate 95 was disposed above ribbon 120a; plate 96 below the ribbon 120a and rollers 187; plate 97 above ribbon 20a and below plate 96; plate 98 below ribbon 20a and rollers 87 and plate 99 below plate 98. Plates 96 and 97 were formed of transverse valleys and ridges to accommodate the rollers 87 and 187. Plates 95, 96, 97 and 98 are perforated or foraminous.

Figure 7:
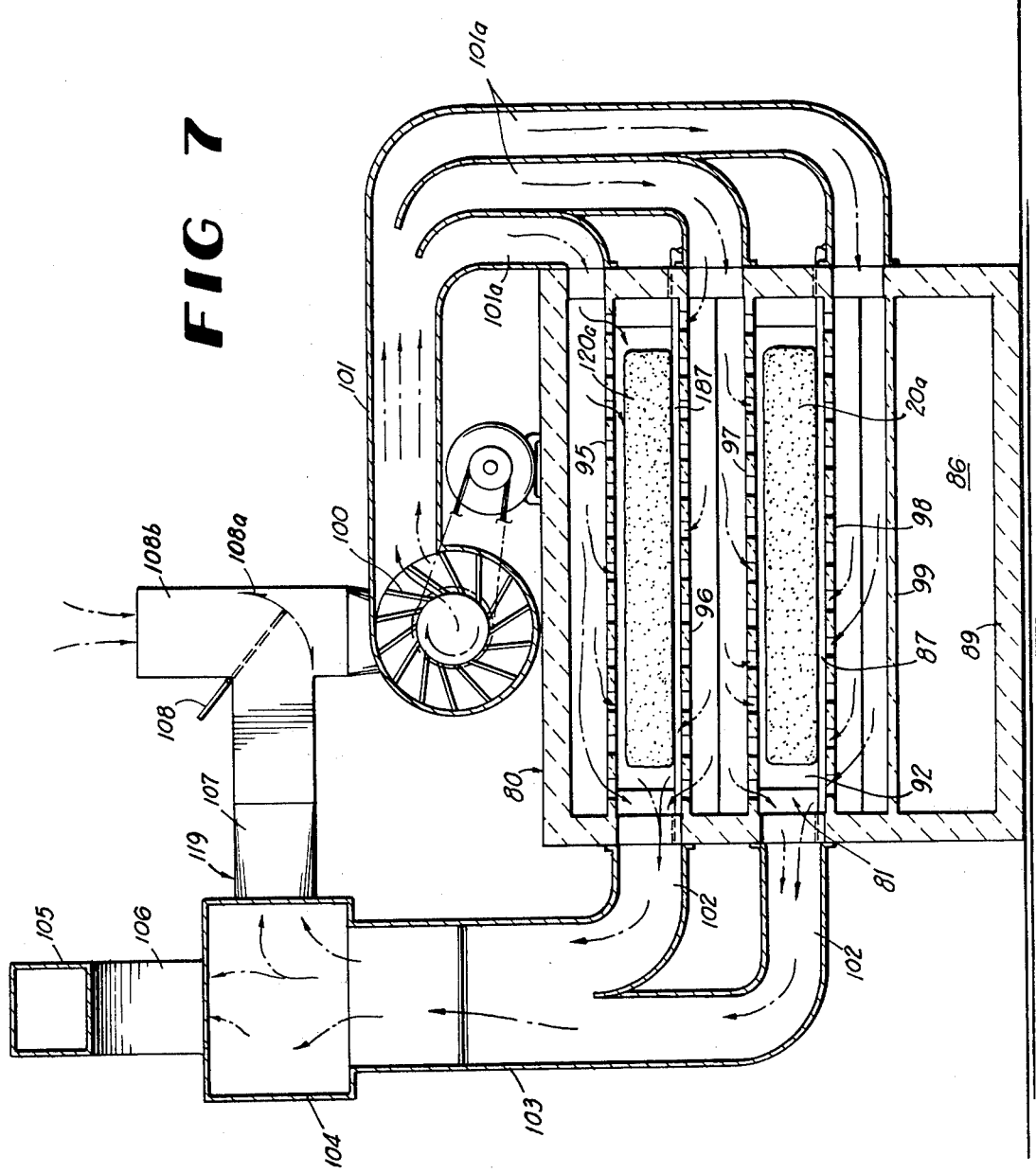
FIG. 7 is a vertical sectional view taken substantially along line 7—7 in FIG. 1C.

Thus, the plate 95 and the top of the lehr 80 formed an upper plenum, plates 96 and 97 a middle plenum and plates 98 and 99 a lower plenum. These plenums are connected to the discharge side of a blower 100 through a branch duct 101a and a manifold 101 so that cooling air is forced into the plenums and directed against the upper and lower surfaces of the ribbons 20a and 120a as shown by the arrows in FIG. 7.

Exhaust air is taken out of the chamber 81 via ducts 102 leading from the opposite side of the lehr 80 at the level of the ribbons 20a, 120a. These ducts 102 lead to an exhaust manifold 103 which communicates with a header 104. A common exhaust duct 105 is connected by a branch duct 106 to the header 105.

A cross-over duct 107, leads from header 104 via tee 108a to the intake of blower 100. The other duct 108b connected to tee 108a opens to ambient air. By manipulation of the damper 108, in tee 108a, the ratio of ambient air to recirculated air is manipulated for cooling of the ribbons 20a, 120a in chamber 81.

The annealing oven is made up of a series of chambers 82a, 82b, 82c, 82d, similar to chamber 81, respectively having individually controlled circulating air systems 119a, 119b, 119c, 119d identical to the system 119e described. All headers, such as header 104, discharge, to the common duct 105, the heat therefrom being used for heat as needed in the plant, or as preheated air to burners.

After emerging from the annealing lehr 80, the ribbons 20a and 120a are transversely cut during their path of travel so as to produce rectangular slabs. These slabs are on the order of 4 feet to 8 feet wide, cut to length as ordered. Trimming of edges, planing of surfaces, and cutting into smaller pieces is done as required. Roof tile may be fabricated with interlocking joints.

Periodically throughout the length of travel of the ribbons 20 and 120 and the continuation of such ribbons, namely the ribbons 20a and 120a, there are provided vertically disposed guide rollers 121 which are on opposite sides of the path of ribbon 20, 120, 20a, 120a so as to guide the ribbons through the respective ovens 25 and 80.

Figure 8:
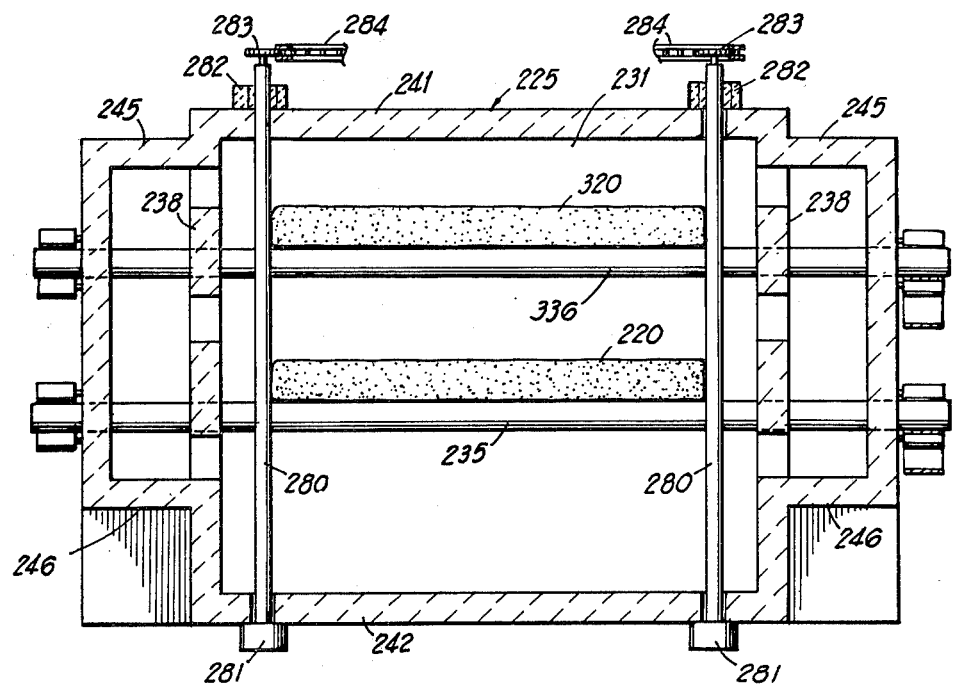
FIG. 8 is a vertical sectional view similar to FIG. 4 of a modified form of the kiln of the present invention.
Figure 9:
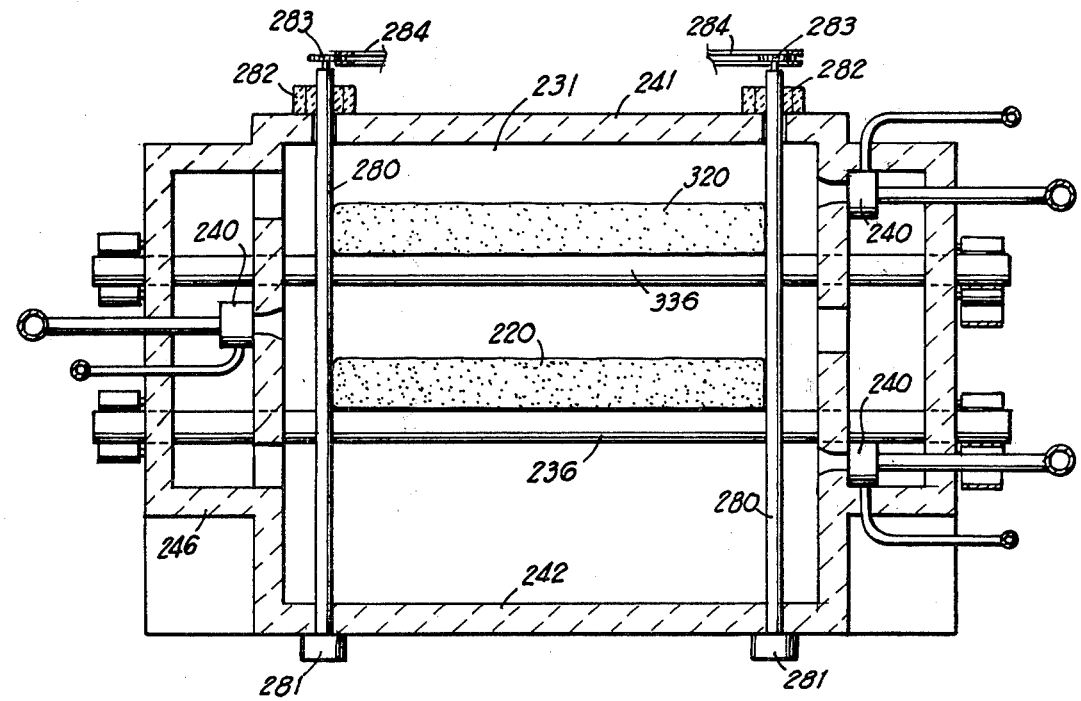
FIG. 9 is a vertical sectional view similar to FIG. 5 of a modified form of the present invention.

In FIGS. 8 and 9 is illustrated a kiln 225 which is identical to kiln 25 except that it has vertical guide rollers 280 and drives therefor. In more detail, the kiln 225 includes inner walls 238, outer side walls 244, horizontal walls 245, 246, roof 241 and bottom 242 and rollers 235, 236, 335, 336 which receive and transport the ribbons 220 and 320 through the preheating chamber 231 and firing chamber 232. Fuel is supplied in the firing chamber 232 through nozzles 240.

As seen in FIGS. 8 and 9, there are a plurality of longitudinally spaced opposed, pairs of vertically disposed guide rollers 280 in kiln 225, projection up between the adjacent horizontal rollers 235, 236, 335, 336. The function of such rollers 280 is to guide the charges 220 and 320 in their longitudinal path through kiln 225. The ends of rollers 280 protrude through appropriate holes in top 241 and bottom 242 of kiln 225. The bottom portions of vertical rollers 280 are received and journalled by thrust bearings 281. The upper end portions of rollers 280 pass through bearings 282 and protrude outwardly therefrom.

The upper ends of rollers 280 receive sprockets 283 around which passes a continuous chain 284 which drives the opposed pairs of rollers 280 in opposite directions at approximately the same peripheral speed of the rollers 235, 236, 335, 336.

The spacing of the rollers 280 is a matter of choice; however, they should be sufficiently close to prevent appreciable lateral movement of the charge 220 or 320. The lehr 80 and the kiln 25 can be equipped with such vertical rollers, as rollers 280, if desired.

THIRD EMBODIMENT

The third embodiment depicted in FIGS. 13A, 13B, 13C, 14, 15, 16 and 17 has multistage extruders formed of rectangular vertically disposed hoppers 310 and 410 having downwardly converging side walls 312 and 412 joined by triangular end walls 311 and 411 and compression rollers 313, 313a, 313b, 319, 413, 413a, 413b and 419.

The power driven compression rollers 313, 313a are disposed on opposite sides of the mouth of hopper 310 and, with end rollers 319, compress and feed the charge as a rectangular compacted stream, downwardly. Thus, the axles 315 of these rollers 313, 313A and the axis of rollers 319 are disposed in a common horizontal plane.

The second stage power driven compression rollers 313b is disposed below roller 313 with its axis parallel to the axles 315 of rollers 313, 313a. The rollers 313 and 313b cooperate to squeeze and feed, as a stream, the charge horizontally. A curved sheet 317, concentric with the periphery of roller 313 to define an intermediate chamber therebetween. The sheet 317 extends from adjacent the inner periphery of roller 313a to adjacent the inner periphery of roller 313b and functions as a guide means to guide the outer surface of the stream. Thus, rollers 313 and 313a give the clay charge an initial squeeze feeding the stream downwardly and the rollers 313, 313b a second and subsequent squeeze, feeding the stream horizontally. Additional opposed rollers (not shown) can constitute subsequent stages for cooperating with rollers 313, 313a, 313b in shaping, compressing and feeding the charge as a rectangular ribbon 320 of indeterminate or continuous length fed horizontally onto a receiving slide plate 317a arranged outwardly adjacent to the upper periphert of roll 313b. Thence, live rollers 318 feed the ribbon 320 into the horizontal kiln 325 through opening or entrance port 309 in front or entrance end 326 to subsequently emerge as a hot cellulated product from the exit opening or port 360 in the exit end 327 of the kiln 235.

The hopper 310 receives a premixed raw or green charge formed of a mixture of clay, water and carbonaceous material, as described above.

The hopper 410 has identical end walls 411, side walls 413, rollers 413, 413a, 413b, 419, curved sheet 417, slide plate 417a and heater 428 for discharging a compacted horizontal ribbon 420 of green clay charge, identical to and above ribbon 320.

Ribbon 320 is fed next to a coating zone where glaze or engobe is sprayed onto the upper surface of the ribbon 320 by a nozzle assembly 329 having a horizontal header 329a carrying a plurality of spaced downwardly directed nozzles 329b. Below the emerging ribbon 320 is another nozzle assembly 329c group of nozzles 329d carried by a transversely extending header 329e. The nozzles 329d discharge a parting or releasing agent onto the bottom perhaps the sides of ribbon 320. The parting agent is preferably a slip formed of raw, high temperature, fire clay and water and sufficiently fluid to pass through the nozzles 329d.

Nozzle assemblies 429 and 429c, similar to nozzle assemblies 329, 329c, are provided for ribbon 420.

Thence, the power driven rollers 318 and 418 feed the ribbons 329, 420 through ports 309, 409 into kiln 325. Horizontal power driven or live rollers 335 receive ribbon 320 and horizontal power driven rollers 435 receive the ribbon 420. The upper peripheries of rollers 335 and 435 form parallel horizontal conveyors which feed the ribbons 320 and 420 at uniform rates through the kiln 325, the rollers 335, 435 being driven as illustrated in FIGS. 11 and 12.

According to the present embodiment, the kiln 325 is provided with a plurality of horizontally disposed muffle plates 330a, 330b, 330c, 330d which partition the kiln 325, throughout its length into a plurality of alternately spaced combustion chambers and muffle chambers, the combustion chambers being the longitudinal extending chamber 347a, 347b and 347c. Thus, the upper chamber 347a is above the top ribbon 420; the intermediate chamber 347b is between upper rollers 435 and lower rollers 335; and the lower chamber 347c is below the rollers 335. The purpose of the combustion chambers 347a, 347b and 347c is to separate the ribbons 320 and 420 from the combustion gases so that the ribbons will be in a reducing or neutral atmosphere, at least during the period in which the temperature of the ribbons is above about 800° F.

The muffle plates 330a and 330b thus define, therebetween, a tubular upper muffle chamber 431 and the plates 330c and 330d, the lower muffle chamber 331 within which are the rollers 435 and 335 and the ribbons 420 and 320. Baffles or muffle plates 330a and 330c are inclined slightly so that the latter portion of chambers 331, 431 progressively widen gradually toward the exit ports 360 and 460 and corresponding portions of chambers 347a and 347b progressively narrow toward the end 327.

The muffle plates 330a, 330b, 330c, 330d preferably formed of sheets of fused silica which will permit termperatures within the kiln 325 of up to about 2700° F. To produce such muffle plates, the silica charge for the kiln 525 should be provided with a silica or sand glaze along the upper surface and then after firing, the glaze thus formed should be sawed off of the foamed remaining product. A succession of fused silica sheets disposed transversely side edge to side edge in the kiln will make up each of muffle plate 330a, 330b, 330c, 330d. When installed, the sheets should be heated initially to about 2300° F. At that temperature, the sheets will slowly devitrify to produce cristobalite crystals which have less tendency to sag at higher temperatures. Thereafter, the higher temperatures, up to about 2700° F., can be used.

The rollers 335 and 435 protrude through the side walls 344 of the kiln 325, the end portions thereof being supported by wheels or rolls 370a, 370b, 370c and driven by belts 372, as described above for the preceeding embodiment.

Staggered fuel nozzles 340a, disposed in about the last half, direct an ignited air and gas mixture transversely across the upper chamber 347a for heating it, while similar staggered nozzles 340b and 340c do the same for the central or intermediate chambers 347b and 347c, respectively. Air lines 300 supply air through branch lines 301 to the nozzles 340a, 340b, 340c while gas or oil fuel lines 302 and branch lines 303 supply the fuel thereto.

At the entrance end of kiln 325, an exhaust assembly or means, which is identical to the exhaust assembly of FIG. 1, is provided. It includes a motor 52 driving, through belt 53, a blower 41 for drawing the products of combustion from the discharge ends of chambers 347a, 347b, 347c, through ports 348a, 438b, 438c and manifolds 349, and discharging the same through exhaust stack 354.

Figure 13C:
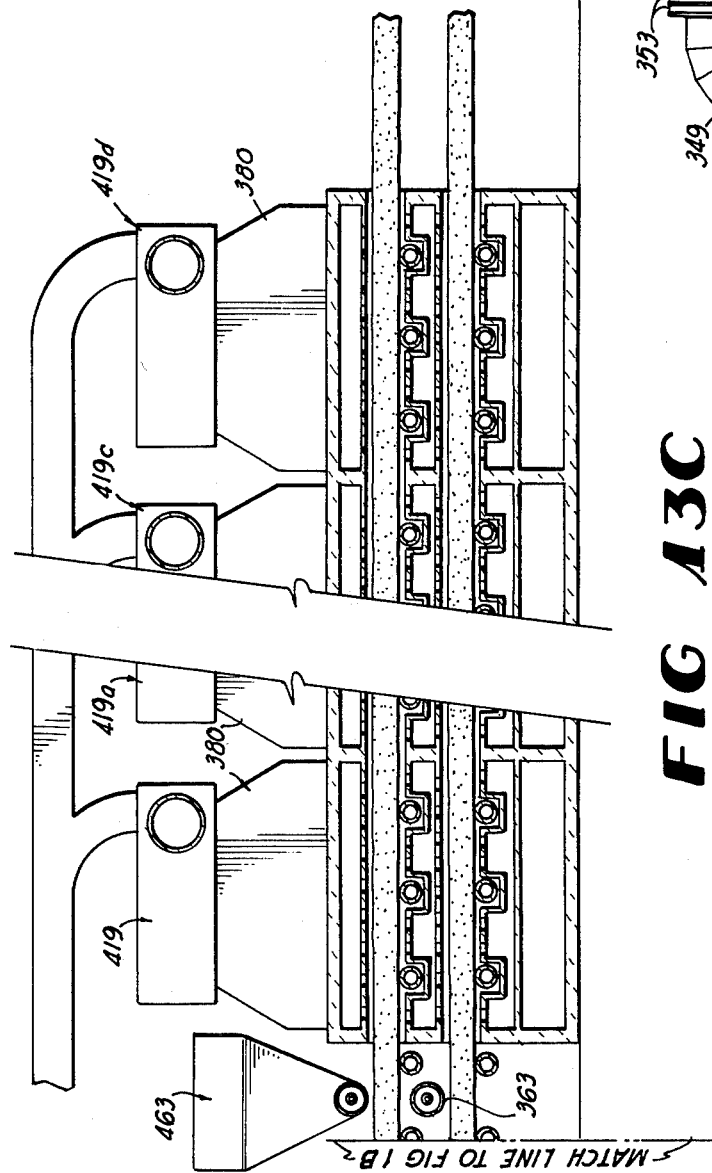
FIG. 13C is a continuation of the view shown in FIG. 13B and showing the glaze applicators and the annealing lehr.
Figure 15:
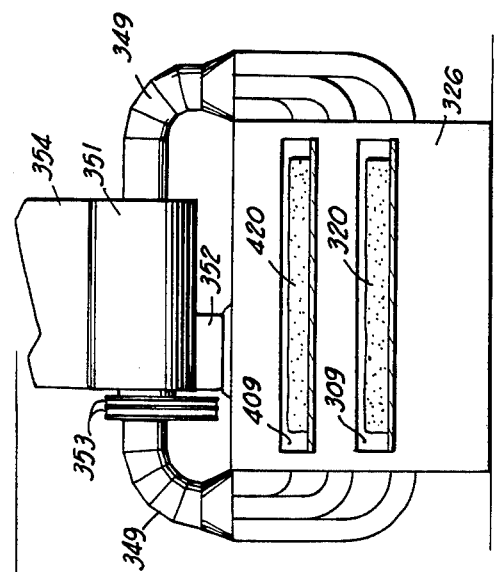
FIG. 15 is a vertical sectional view taken substantially along line 15—15 in FIG. 1A.
Figure 14:
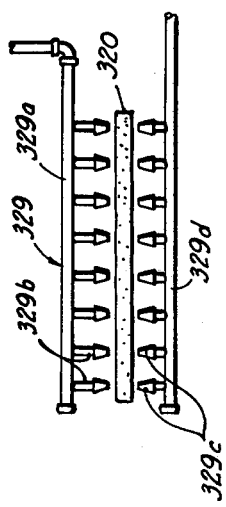
FIG. 14 is a vertical sectional view taken substantially along line 14—14 in FIG. 13A.
Figure 16:
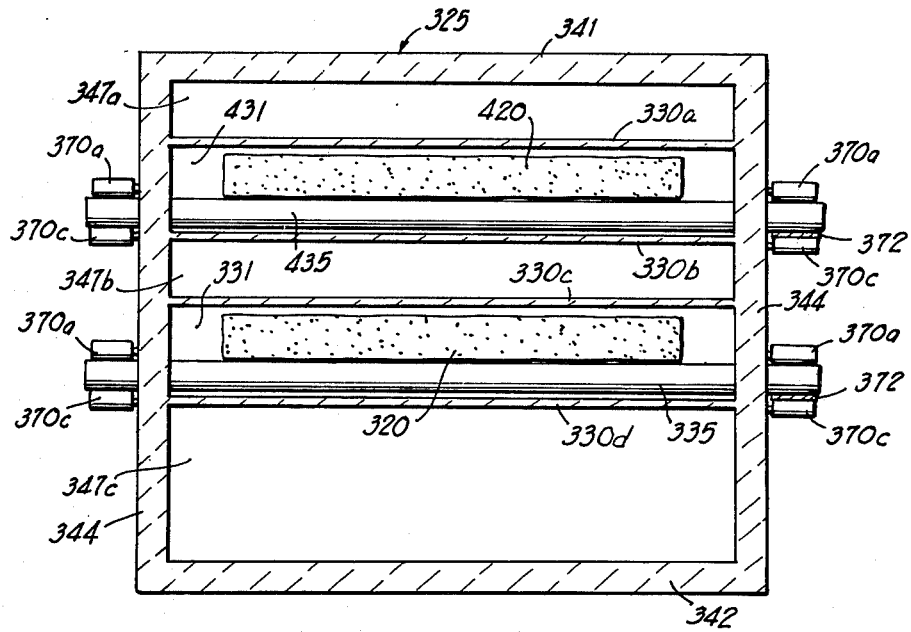
FIG. 16 is a vertical sectional view taken substantially along line 16—16 in FIG. 13A.
Figure 17:
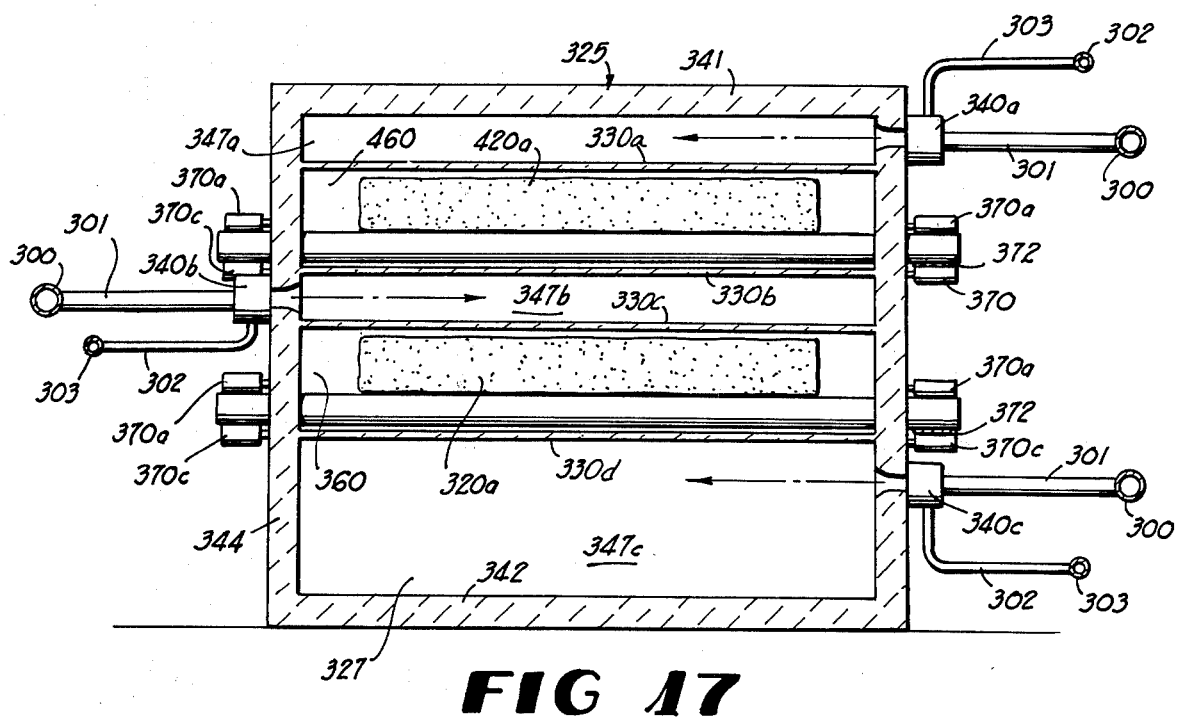
FIG. 17 is a vertical view taken substantially along line 17—17 in FIG. 13B.

As seen in FIG. 13c, the ribbons 320a and 420a, after being bloated or cellulated, are fed beneath the glaze applicators 363 and 463 and thence to annealing oven or lehr 380 having successive chambers provided with air systems 419a, 419b, 419c, 419d, the lehr being identical to lehr 80.

It is thus seen that the gases of combustion which are formed in the rear of the interior of the kiln by the burning of fuel by nozzles 340a, 340b, 340c are fed forwardly toward the front of the kiln 325 and exhausted, therefrom as the charges are moved in counter flow relationship thereto. Thus, the entering ribbons 320 and 420 of charge are progressively dried, then preheated, then fused and cellulated as it is moved through the kiln.

Figure 18A:
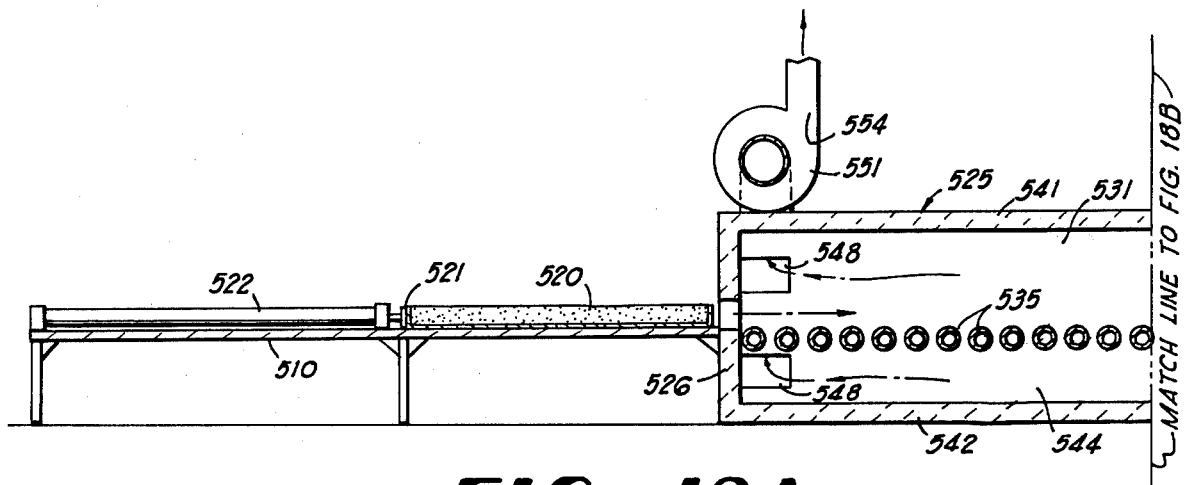
FIG. 18A is a vertical sectional view similar to FIG. 1A and FIG. 13A showing a fourth embodiment of my invention.
Figure 18B:
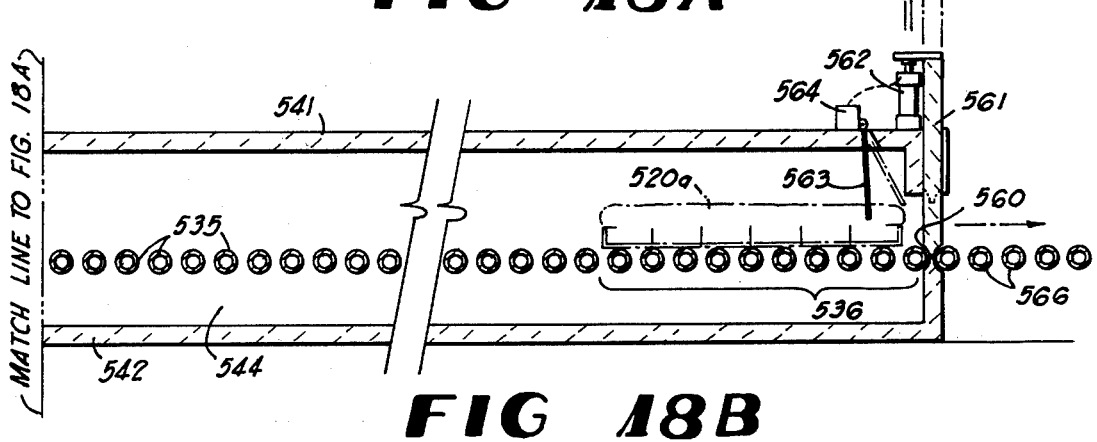
FIG. 18B is a continuation of FIG. 18A.

In the fourth embodiment depicted in FIGS. 18a and 18b, a rectangular kiln 525, having parallel juxtaposed, freely rotating, rollers 535, and live or driven rollers 536. Rollers 535 receive, from a ramp or platform 510, a charge 520 carried in a tray or pan 521. This pan 521 is rammed, by a reciprocating hydraulic ram 522, through entrance opening 509 in front wall 526, into the firing chamber 531 of the kiln 525. Pan 521 is received on the roller hearth, formed by horizontal idler rollers 521, and is moved thereon by being pushed by successive similar pans 521, with their charges 520, as such pans are successively fed by the ram 522 into the kiln 525.

The kiln 525 is heated by fuel burners (not shown) as in the preceeding embodiments and the products of combustion exhausted by blower 551 through stack 554, the suction being drawn through exhaust ports 548. The pan 521 thus eventually reaches the line rollers 536 at the exit end within the kiln 525 which, when actuated, discharge the pan through momentarily opened exit port or opening 560 (aligned with open 509) when the vertically slideable door 561 on the kiln 525 is raised by a ram 562 to the position shown in FIG. 18B in broken lines.

A motor (not shown) drives, through a unidirectional drive, all rollers 536, so that some resistance to feed along rollers 536 is encountered. This applies a back pressure which keeps the juxtaposed tandem arranged pans 521 on rollers 535 and 536 in abutting relationship.

A pivoted finger or switch arm 563 connected to switch 564 as shown in FIG. 18b acts as an electrical control means for both the motor (not shown) for rollers 536 and ram 562, so that the door 561 is opened when the arm 563 is moved toward door 560 by the cellulated charge 520a, and the rollers 536, thereafter, actuated so as to discharge one tray 521 from the oven or kiln 525. Then the door 561 is closed and another cycle can commence.

Fuel nozzles (not shown) but similar to nozzles 40 and 340a, 340b, 340c, heat the kiln 525.

Figure 19:
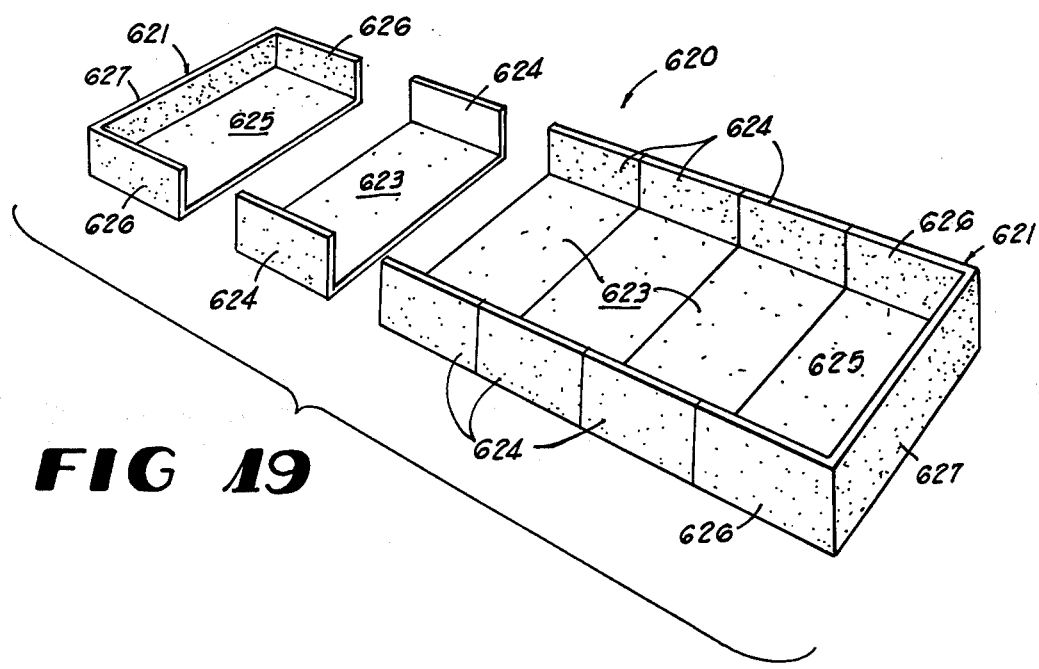
FIG. 19 is an exploded perspective view of abutting sections forming a first pan for receiving an unpressed charge of sand or brickettes.
Figure 20:
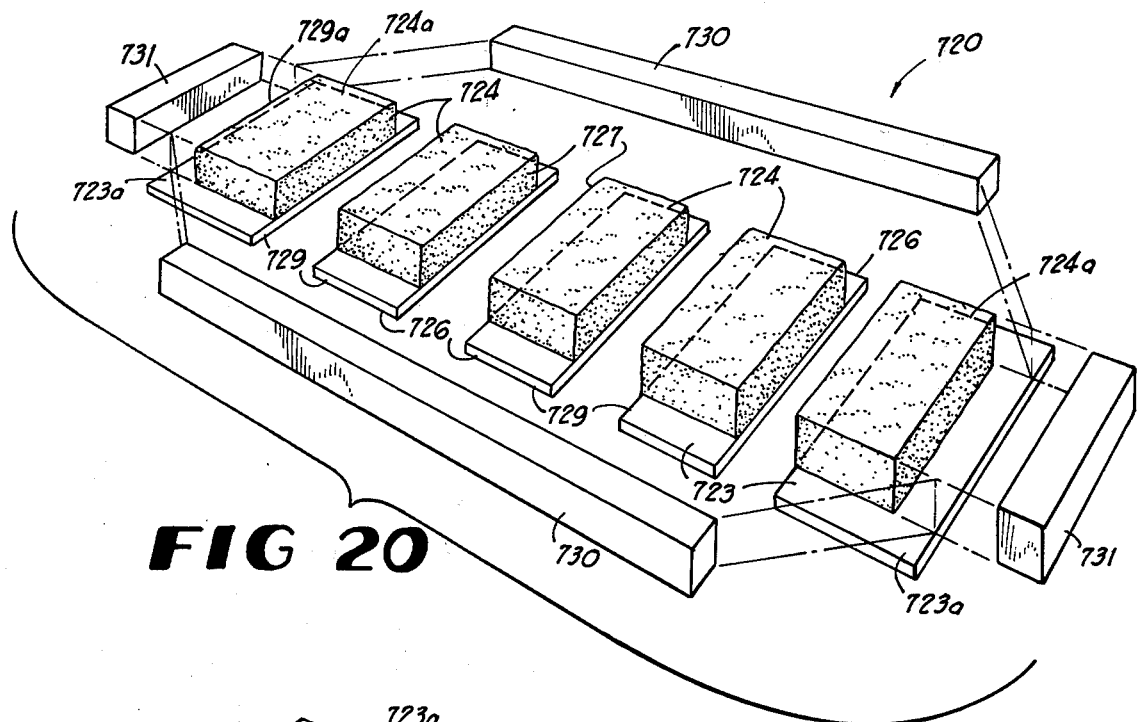
FIG. 20 is an exploded perspective view of several abutting sections forming a pan, the sections being shown after being pressed with their respective portions of the total charge.
Figure 21:
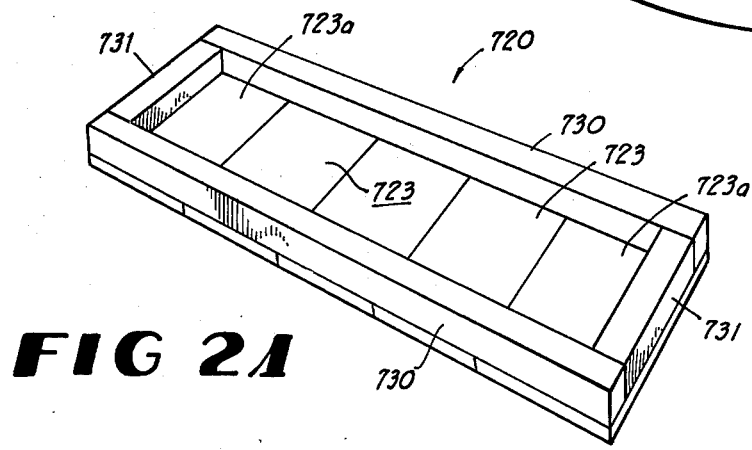
FIG. 21 is a perspective view of the assembled pan of FIG. 20, without the charge.
Figure 22:
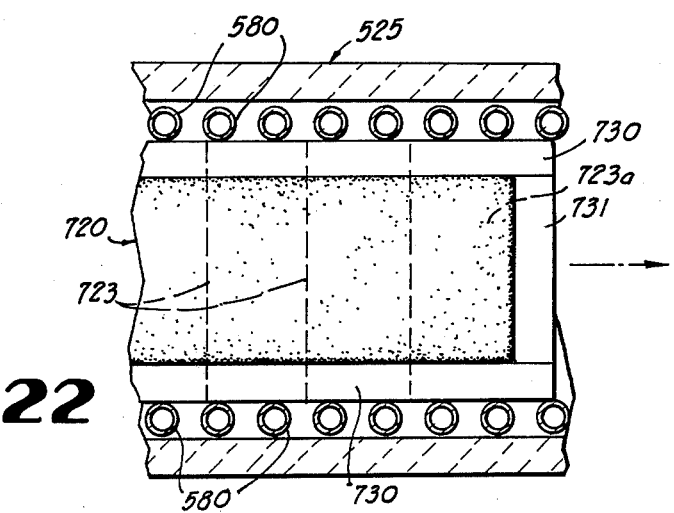
FIG. 22 is a fragmentary plan view of a portion of the pan of FIGS. 20 and 21 with its charge within the kiln of FIG. 13A, 13B and 13C, the sides and vertical alignment rollers of the kiln being shown in cross-section.

Either tray or pans, such as pan 620, of FIG. 19 can be used as the pans such as pan 520 or the pans such as tray or pans 720 depicted in FIGS. 20, 21 and 22 can be used as the successive pans such as pan 520. Indeed pans 620 and 720 may be intermixed.

Referring specifically to FIG. 19 the sections tray or pans 620 include a pair of opposed end segments 521 and a plurality of intermediate segments 622. Segments 622 are each channel members having flat rectangular bottom plates 623 and upright, opposed, spaced, parallel, rectangular side plates 624 projecting from opposite edges of bottom plate 623.

The end sections are also channel members having rectangular base plate 625 and side plates 626. One end is closed by a rectangular end plate 627.

In use, the sections 624 and 625 are assembled by simply being placed edge to edge, on platform 510 to form pan 620, closed on its sides and bottom. The silica charge of raw sand, water and carbonaceous material is hand packed or rammed into the pan 620 and the ram 522 is used to push each pan 620 successively into the oven.

The panels or plates 623, 624, 625, 626, and 627 are formed from sheets of refractory material, i.e. pressed carbon, such as coke fines or charcoal granules. Pitch or tar may be employed as a binder for the coke or charcoal and as an adhesive to join the appropriate edges together.

When the sand fuses in the kiln 525, the charge holds the segments or sections 622, 623 together until the charge is cooled after becoming fused and cellulated. The fused silica can be cooled quite rapidly and needs no annealing. Thus, no lehr is required. External rollers 566 in front of rollers 536, deliver the silica to an area where it cools and the sections 621 and 622 are removed for reuse.

Referring to FIGS. 20, 21 and 22, a second form of segmented or sectional pan 720 includes a plurality of abutting flat rectangular intermediate bottom plates 723 and end plates 723a which are each provided with a pressed or compacted right prism or rectangular block 724 of silica charge. A conventional press (not shown) can be employed to compact each block 724 onto its associated bottom plate 723 or 723a, or the blocks may be pressed separately and then placed on the base. The outer or side ends 725 of the block 724 should terminate inwardly of the end edges 726 of bottom plate 723. The sides 727 of each block 723 should end in alignment with the side edges 729. The outer edges 729a of end blocks 724a should terminate inwardly of the outer edges 729a or end plates 726a.

Thus, the plates 723, 723a, when assembled have perimeter portions which receives thereon longitudinal spaced parallel side bars 730 and spaced parallel transverse end bars 731 which form elements of a removable rim, resting on but not secured to the plates 723, 723a, as shown in FIG. 21. Bars 730 extend the length of the juxtaposed plates 723 and 723a, the bars 731 are inwardly of ends of bars 730.

When assembled, the pan 720 has the individual blocks 723 and 723a abutting each other. These blocks 723 and 723a fuse together as the silica charge, formed by blocks 723, 723a, fuses and cellulates, while passing through the oven or kiln 525.

As seen in FIG. 22, vertical idler rollers 580 disposed at spaced intervals within the kiln 525, guide the pans, such as pan 720, through the kiln 525, the rollers 580 preventing appreciable outward movement of the side bars 730 and the bars 731 preventing appreciable movement inwardly.

The elements namely plates 723, 723a, and bars 730, 731 are quite readily stripped from the monolithic rectangular product after it has cellulated, fused and then cooled.

Thus, a small press, (not shown) can be used to process a very long cellulated fused silica product.

The trays 620 and 720 are inexpensive and expendable. It is expected therefore that one, two or three uses is all that they would withstand. Being of carbonaceous material or carbon, they may be consumed by oxygen and water vapor. Hence, they function to assume a reducing condition around the charge and when the hot trays and charges are discharged to the atmosphere, they may be consumed by the ambient air.

The fact that the trays and expendable permits the burning of fuel, such as gas, oil or solid fuels, i.e., wood or coal, within the kiln to generate products of combustion, such as water vapor. These products of combustion are consumed by reacting with the carbon of the trays.

In any of the embodiments where either a clay charge or a silica charge is employed and if the kiln 25, 225, 325, or 525 is approximately 40 feet long, the speed of the feed through the kiln should be such as to leave the charge in the kiln from about 10 minutes to about 60 minutes, depending on the thickness of the charge. Thus, a ⅜ inch thick charge should be moved at about two feet per minute to remain in the kiln for 20 minutes while a five inch thick charge should move at about one foot per minute.

The spacing of the rollers in the kiln should be such as to preclude appreciable sagging, particularly after the charge has been fused and is in a relatively viscous condition. Thus, in the latter part of the kiln, care should be taken to provide the rollers at spacings of less than about five inches on center. Thus too will vary with the thickness of the charge. If the charge is thin, i.e., about ⅜ inch, the rollers should be arranged at about 1½ inches apart, on centers, and if the charge is thick, for example, five inches thick, the rollers should be about four inches apart, on center.

In the kiln prior to the point or zone in which fusion takes place, the ribbons are sufficiently self-supporting for the rollers to be from about six inches to twenty four inches apart, on center.

The charges, supported on plates or in trays, have no such problem of sagging, since the carbon sheets are sufficiently rigid to provide support. The rollers should, however, be sufficiently numerous to support a segment of a pan by two or more rollers at all times.

Closer spaced rollers interrupt the continuity of the vertical wall, entirely, or leave very thin columns of refractory wall and/or liner between the rollers, with little clearance around the rollers.

With conventional refractories, it is difficult to maintain wall support above the rollers, due to movement and shearing due to thermal expansion, particularly in multiple deck and muffled kilns. For this reason the kiln is built of fused silica, as a rule, in any part subjected to not more than about 2700° F., and support wall sections on the cold sides. Solid or cemented layers do not crack off due to differential expansion.

It is noted that in the usual operating temperatures in the hot zone, the fused silica will tend to devitrify in time, converting to cristobalite which has a disruptive thermal expansion below about 600° F. The kilns are normally operated for months at full temperature, and it is simple in this case and in many other operations to maintain the devitrified parts above 600° F. by a small holding fire.

PROCESSES

From the foregoing description, the operation or process of the apparatus should be apparent. One charge which can be satisfactorily processed to a foamed or bloated clay product is made up by weight of 100 parts clay, from about 6 parts to about 15 parts water, and from about 1/20 part to about 2 parts available carbon in carbonaceous material. This I term a moist clay charge or mix.

The clays which I have found useful as a raw material include surface clays, ball clays, kaolin, shale, and bentonite. Other clay-like materials are useful for my process, the essential quality being the small ultimate particle size of the material and the ability to sinter into an impervious mass. Thus, clays and clay like materials which have a mean particle size of less than 2 microns are particularly useful in my process. Such clays are found in nature in rock like form; They should be crushed to a granular form, typically to pass through a 6 mesh screen.

There are innumerable organic or carbon compounds which are useful as the carbonaceous material in my process. They, however, must be soluble in water and must char upon being heated. Therefore, sugar, or sodium lignite (Orzan A) is quite useful as the carbonaceous material.

It will be remembered that if organic materials are present in clay, itself, soluble carbonaceous material is used in less amount so that the total of the naturally occuring carbonaceous material and the added available carbon is up to about 2 parts per 100 parts clay. Another charge which can be processed to a foamed fused mineral is made up of silica, carbonaceous material and water.

A useful silica raw material is a sedimentary quartzite occurring naturally in massive form, having an average crystallite diameter of about 10 microns and less, preferably between 5 and 10 microns, and containing negligible intercrystalline material. A preferably useable silica raw material contains at least 99% $SiO_2$, on an oxide basis. Such a silica raw material may be found, for instance, in Arkansas, Illinois, and California and has the following typical chemical analysis:

TABLE I

|  | Percent |
| --- | --- |
| $SiO_2$ | 99.2 |
| $Fe_2O_3$ | 0.10 |
| $Al_2O_3$ | 0.14 |
| CaO | 0.05 |
| $TiO_2$ | 0.01 |
| MgO | 0.03 |
| Alkalies | 0.27 |
| Ignition loss | 0.20 |

In practice, the quartzite material is crushed after removal from the mine, typically to pass through about a 6 mesh screen. If a purer form of silica is desirable, a silica flour obtained by fine grinding quartzite sand or gravel should be used. The addition thereto of colloidal silica improves the surface area of the quartzite, as will be explained, hereinafter.

The charge is formed by admixing 1000 parts silica and from about ½ part to about 4 parts available carbon in soluble carbonaceous material and sufficient water to provide for the thorough distribution of the soluble carbonaceous material and the colloidal silica, if present. Hence, from about 50 to about 100 parts water is recommended. The silica charge must be placed on plates which are fed end to end through the kiln 25 in place or ribbons 20, 120.

Still another form of silica raw material is diatomaceous earth which is a very porous form of silica and foams quite readily. It is not, however, a pure form of silica and its lack of resistance to acids detracts from its usefulness.

In the processing of either the clay charge or the silica charge, the charge is compacted using either a low pressure press or rolls, such as rollers 13 and 19. The clay charge will extrude into the ribbons 20, 120. The silica charge, however, may require carrying plates or carriers 200 along its bottom surface.

The carrying plate 200 is expendable and if a carrier plate is used it is made in the same press where the charge is compacted. The plate 200 is formed of a binder and carbon material. It is preferably composed of a binder and carbonaceous material such as pitch and coke fines or pitch and coal dust, as is practiced in the carbon forming arts. The plate 200 is produced on an aluminum foil sheet or other parting agent 201 in press 202 so that it does not stick to the heated platen 203. The aluminum will melt in the kiln 25 and burn up. If desired, silica sand corresponding in purity to the silica of the interior may be placed on the upper surface of the silica charge (without a blowing agent) to form a glaze, when fired.

When the fused vitreous cellulated silica is melted and since the successive silica charges in chamber 32 are abutting as they are passed through chamber 32, the silica of one plate 200 fuses to the silica of the next so that the ribbon produced by the silica in kiln 25 progressively becomes integral.

It should be pointed out also that the plates 200 are to be removed from the ribbon of fused silica, once the cellulated fused silica has cooled.

When the charge enters the kiln 25, regardless of whether it is a silica charge or a clay charge, it is subjected to about a 600° F. temperature and is progressively subjected to increasing temperatures so that, as it reaches the end of its travel in chamber 31, the charge is being subjected to environmental temperatures of from about 50° F. to about 200° F. less than the temperature of the gases of the firing zone or chamber 32. The charge then enters the firing chamber 32 where the temperature should be maintained, for example, as follows:

For surface clay charges and bentonite charges-2000° F. to 2300° F. For other clay charges, 2100° F. to 3100° F. For silica charges, 3000° F. to 3300° F.

In any event, the temperature and turbulence, which determine the heat transfer characteristics, should be such that there is not more than about 150° F. temperature differential between the surface temperature of the charge and the lowest temperature in the interior of the charge.

While time of firing and temperatures vary for each raw material and thickness of the final product, I have found in using California clays mined in the vicinity of Corona, that roof tile sheet, 1" to 1½" thick and weighing about 5 lbs. per square foot, can be made by preheating the charge for about 30 minutes and then firing for about 30 minutes at a temperature in the firing zone or chamber 32 of about 2140° F.

Sintering of the charge usually takes place when the charge is about 100° F. to about 500° F. below the melting point of the clay or the silica in the charge. Thus, sintering may take place largely in the preheating chamber 31.

In the chamber or firing zone 32, the charge progressively swells or bloats as cellulation takes place and upon emerging from the chamber 32, the foamed or cellulated raw material has a density of 8 lbs. per cubic foot to about 100 lbs. per cubic foot and has a glassy, vitreous, cellular structure of mostly non-innerconnecting cells.

When good results are obtained 98% of the cells have a diameter of less than 2 mm and in many cases less than 1 mm. This fine cell structure gives uniformly thin cell walls which make for ease in fabrication.

If the raw material is silica so that a foamed fused silica product is produced, it is not necessary to feed the product to the annealing lehr or oven 80. Instead it must be cooled rapidly to about 2000° F. and then as rapidly as is convenient.

With all other materials, the product must be fed to the annealing lehr 80 and therein progressively cooled. For best results, the annealing curve for each product should be established experimentally. When producing the roof tile from Corona clay, as described above, a curve similar to that of ¼" thick plate glass gives good results.

As pointed out above, when the foamed or cellulated clay ribbons 20a, 120a which are now fused or vitreous enter the lehr 80, they are initially cooled quite rapidly in oven 81 by the introduction of ambient air under forced draft conditions against the ribbon surfaces. This reduces the temperature of the ribbons 20a, 120a to just about annealing temperature. Thereafter, the products pass through the annealing chambers 82a, 82b, 82c, 82d where the ribbons are gradually cooled and are then fed out to rollers 93, 193, emerging at a permissible temperature to finish cooling on the rollers 93, 193.

The speed of the ribbons or plates through the kiln 25 and lehr 80 is from about 3" per minute to about 72" per minute and the spacing of the rollers 36, 136 toward the discharge end of chamber 32 is from about 1" to about 6" on centers.

The viscosity of the material during cellulation is from about $4.8 \times 10^6$ poises to $5.2 \times 10^6$ poises, and the material does not sag between rollers.

From a theoretical standpoint, it is known (Norton's Test "Refractories") that iron bearing clays melt at temperatures which are as much as 200° F. lower under reducing conditions than under oxidizing conditions. Thus, in producing the clay charge which constitute the ribbons 20 and 120, I incorporate with the clay, soluble carbonaceous material and water in such proportions that the solution of carbon containing material coats all the particles of the clay. Thus when compacted under low pressures of from 50 psi to 1000 psi, a ribbon of damp clay is produced, the clay being sufficiently loose that in the initial heating the moisture will be driven out of the mixture and leave the carbon containing compound as a very thin coating on all of the ultimate particles of the clay. The carbon containing compound, such as sugar is uniformly distributed throughout the mass and is thoroughly admixed with each particle as a coating thereon. Further heating of the clay charge causes it to sinter, at which time cracks may appear in the surface.

In the chamber 31, however, the atmosphere has an excess of air or oxygen and is, therefore, an oxidizing atmosphere. One or more surfaces of the ribbons 20 and 120 are kept in this oxidizing condition from just before fusion of the ribbon or plate until discharge to the cooler temperatures. The temperature just before sintering and during firing is sufficiently high that the carbon in the surface area of the charge is burned out to a limited depth from the surface of the clay. Thus, a shell of high melting point material is created partially or completely around the ribbon 20 or 120 or the plate.

In the interior of the charge, however, reducing conditions exist, due to the presence of the organic or carbonaceous material. Hence, under carefully controlled temperature conditions within the firing chamber 32, the ribbons 20 and 120 will be maintained so that the shell does not melt or become too sticky to run over the rollers, while the major portion of this charge is melting. As the clay melts, the iron oxide in the clay and the carbon on the surface of each particle can diffuse so as to react with each other to release carbon monoxide and carbon dioxide to the molten viscous clay, thereby blowing the clay to form a multitude of closed bubbles.

If a parting agent or releasing agent is employed for the bottom surface of the ribbon 20 or 120, or the bottom and side surfaces thereof, this releasing or parting agent, upon heating in the kiln is more inert than the clay itself and thus does not stick to the surfaces of the rollers. Furthermore, this releasing agent or parting agent, if supplied on three sides, creates a cradle beneath and on the sides of the ribbons 20 and 120 so as to confine the charge during the period in which it is foamed or cellulated.

I have also found that when cellulation occurs in the firing chamber and the temperature is maintained so as to render the viscosity of the clay at about $5 \times 10^6$ poises, the clay is sufficiently tacky to adhere to the rollers which support the same unless the oxidized skin or other parting is present, and yet is suffficiently viscous that the gas generated by the reaction of the carbonaceous or organic material and the iron oxide or similar oxides of the clay create small bubbles which do not break out, but expand the clay and provide closed cells of essentially uniform consistency.

Through adjusting the carbon content of the clay, the proper amount of gas is formed to give the desired density. Adjustment of the moisture and degree of pressing gives a clay ribbon strong enough to pass over the rollers, but not so dense as to require a long drying time at low temperature.

The carbon reduction of the iron oxides and other oxygen rich compounds in the clay is possible at lower temperatures; however a substantial part of the reaction is delayed until the melting of the charge. It is an essential part of my process that the carbon coating is deposited on each minute ultimate particle in the interiors of the large agglomerated particles of the clay as mined or crushed. Thus, when the clay melts and molecular diffusion becomes faster, the physical meeting of the iron oxide and the carbon is over a very short distance and the reaction takes place promptly. This phenomenon acts as a built-in control to produce gas after sintering but promptly upon melting.

Some porous rocks of compacted quartz crystallites are formed with crystallites or particles almost as small as the ultimate particles in clay lumps. Diatomaceous earth also is silica of fine ultimate particle size but less pure than the purer sands. These silicas, such as quartz crystallites or diatomaceous earth, have larger specific surface areas than pulverized sand and, therefore, larger interfaces. This is another way of saying that a thinner layer of carbon covers a lesser depth of silica and thus the molecular diffusion is quicker due to a shorter path. In some instances the carbon reacts with the silica to produce silicon carbide which subsequently upon further heating reacts with more silica to produce silicon monoxide and carbon monoxide which are the gases in a silica body or in a high temperature aluminum silicate such as ball clay.

In my preferred procedure for producing foamed fused silica of a purer composition, I add sugar and water to a small quantity of commercial colloidal silica solution which is then thoroughly admixed with commercial silica flour. This gives a dispersion of carbon over a much larger surface area than could otherwise be produced even by grinding the silica to minute size.

The silica flour has a particle size of about 15 microns equivalent diameter while colloidal silica is approximately 1000 times smaller. This means that the surface area of a given mass of colloidal silica has 1000 times the surface area of the same mass of silica flour. Thus, I use approximately two parts by weight colloidal silica to 100 parts by weight silica flour and thereby increase the effective surface area of the silica flour by about 20 times. This proportionally increases the area of interface for reaction between the carbon and the silica. Thus, when the charge of silica, colloidal silica and carbon is heated in the kiln 25, the carbon is quite uniformly distributed throughout the silica and, upon heating, the moisture is driven off and the carbon ultimately reacts with the silicon to produce silicon carbide and then the silicon carbide reacts with silica to produce silicon monoxide and carbon monoxide.

Cellulated vitreous fused silica product can also be made from crushed silica rocks, such as quartzite rock or diatomaceous earth, to provide agglomerates of less than $\frac{1}{8}$ inch in diameter. These crushed rocks are admixed with colloidal silica sol and a soluble carbon compound, which will char upon heating, dissolved in water. The solution will penetrate the agglomerates and coat its small particles therein. The subsequent heating will drive off the moisture, leaving the colloidal silica and carbon uniformly distributed on the particles. Continued heating will cause a reaction between the carbon and the available silica and between the carbon and available oxygen to cause cellulation as the silica fuses.

Suitable foamed materials can be produced according to my invention from surface clays, shales, bentonites, diatomaceous earth, and silica. Surface clays and shales obtained from brick, roof tile and flower pot plants in California, Georgia and Germany have been found suitable for my processes. Such clays and shales should be crushed to pass typically through about a 6 mesh per inch screen.

Swelling bentonite from Wyoming and South Dakota and non-swelling bentonite from Mississippi and California are also useful for producing foamed material according to the present invention. All ot these clays (shale and bentonite being referred to as a clay) have been successfully processed in the following manner:

In successive batches, sugar and sodium lignite (ORZAN A) were respectively dissolved in water and then the water was mixed with the clay so as to produce a damp pressing consistency for the clay. In some instances where the clay had a high moisture content, the clay was admixed with drier clay so as to provide an ultimate moisture content of 6% to 15% by weight. Even when only 3% or 4% of the total water was added to the clay, the sugar or sodium lignite was added to this water, prior to the time it was admixed with the clay.

The various samples of the resulting mixtures were each pressed into cakes in flat dies or were hand packed onto carrying plates. The pressed cakes were dried before firing. Cakes or looser packs on carrying plates were individually pushed into a laboratory kiln at approximate temperatures determined by observing the swelling behavoir. The temperatures used were from 2050° F. to 2250° F. No clays failed to cellulate.

I have found that some clays have naturally occurring therein, organic materials containing carbon. These organic materials are well distributed in the clay and present no particular problem except that they must be considered. Thus, in some instances, it is not necessary to add carbonaceous material to the clay. In some instances, where extremely high organic material content is contained in the clays, they should be admixed with other clays so that the resulting charge has about 2% by weight organic material in the mixture. If more than about 2% organic material is contained in the mixture, overblowing and irregularities in the cellular structure will occur. When less blowing or foaming is desired, the organic material in the charge is reduced accordingly. This can be done by admixing with other clays of low organic content. The resulting foamed or cellulated clay will be more uniform and less densely cellulated. When charges were produced with all of the clays, shales, bentonites, mentioned above impermeable cellulated pieces of good uniformity were obtained in all cases, except where an excess of organic material was contained in the charges.

A better understanding of my invention will be had by reference to the following specific examples.

EXAMPLE I

A clay from Fremont, California, (Interlocking Tile Co.) passed through 6 mesh screen, was mixed as follows:
1000 parts clay
10 parts sucrose
110 parts tap water A 12" square tile was formed by pressing at 100 psi, to about 1" thickness.

The tile was introduced into a 700° F. atmosphere for 15 minutes, thence into a controlled atmosphere whereby the tile was substantially sintered without burning out the carbon derived from the sugar, as the temperature was raised to about 2000° F. in a reducing atmosphere.

The tile was passed over rollers at about 12" per minute for 20 minutes in an oven at about 2100° F. in an oxidizing atmosphere. The rollers were clean and new before this run and the tile passed over without being stopped by sticking to the rollers. There was no evidence of sagging between rollers. The tile had expanded to about 16"×16" and had a reddish brown skin due to the skin oxidation. The interior was greenish dark gray and cellulated to about 30 lbs. per cubic foot.

A number of runs were repeated, and some sticky spots of molten clay or glaze from various experiments were on the rollers and began to pull off patches of oxidized skin as the contiguous interior material softened and cellulated.

EXAMPLE II

Green tiles from Example I were painted on the bottom and sides with an engobe of raw and calcined high temperature fireclay, after preliminary drying.

These tiles were fired as in Example I and showed less tendency to cause sticky spots on the rollers, but where a sticky spot existed there was still a tendency to pull off the engobe and oxidized skin, which could build until the conveyor would become inoperable. The tile expanded laterally to about 16"×16".

EXAMPLE III

A mixture of 60 parts calcined fireclay to 40 parts raw fireclay and 10 parts water was spread over the bottom of a die cavity and patted up on the sides. The die was then filled with the clay charge from Example I and tiles pressed otherwise as in Example I.

These tiles were fired as in Example I and cellulated to about the same density. It was noted that while the tile had expanded laterally to about 16"×16" in Example I and II, the tile of this example expanded in thickness rather than laterally.

EXAMPLE IV

A parting agent was made by mixing 12 parts raw fireclay to 88 parts silica sand and 10 parts water. This mixture was used to make the bottom coating of the tile of Example I and processed as in Example II. When tile with this bottom coating was passed over the rollers in firing, the sand, exposed to a sticky spot, was pulled off only as it was exposed, until eventually the sticky spots on the rollers were well covered. In subsequent runs these rollers were then able again to receive the clay charge without the charge sticking.

EXAMPLE V

Tile similar to Example I were made with Wyoming bentonite instead of clay and the sugar addition was reduced to about 2 parts per 1000 parts of bentonite. At a firing temperature of about 2300° F. similar results were obtained as in Examples I, II and III.

EXAMPLE VI

In the bottom of the die I spread a sheet of aluminum foil and spread a dry mixture of 2 parts pulverized petroleum coke and 1 part pulverized pitch from a foundry supply house. The die was then heated by a gas flame to melt the pitch, then it was pressed to make a carbon plate. This procedure was repeated to make additional carbon plates from less than 1/16" thick to more than ⅛" thick.

The carbon plates were then cooled and loaded with a charge about 8"×8"×1" by placing a form on the plate and filling the form and hand ramming.

For this Example VI the charge was Mississippi M & D ball clay, mixed with sucrose and water as in Example I. The sample was fired on one of the carbon plates, going directly from room temperature into the kiln at about 2800° F., where it was fired for about 20 minutes. Temperature was adjusted by trial and error to achieve good cellulation.

In all the above examples, the cellulated specimens which were brought into cold air, from the kiln, fragmented from thermal shock. At the end of a run some specimens were placed in an annealing box and the cooling rate adjusted to given unbroken samples.

EXAMPLE VII

This was a repeat of Example VI, except that crushed diatomaceous earth was substituted for the clay. The temperature was adjusted by observation of the melting and cellulation, and was judged to be about 3100° F. The sucrose addition was about 2 parts per 1000. Good cellulation was obtained at about 20 pounds per cubic foot, and the product did not break when brought from the kiln temperature into cold air.

EXAMPLE VIII

The procedure of Example VII was repeated except that porous quartzite rock (see Table I) was crushed and used in lieu of the diatomaceous earth.

The firing temperature was about 3200° F. Quick cooling was successful and cellulation was good after about 30 minutes firing.

EXAMPLE IX

The procedure of Example VII and VIII was followed except that the charge was a purer quartzite silica, principally a purchased 325 mesh silica flour, 99.8% pure silica.

To this charge per 1000 parts was added 4 parts sucrose in 49 parts water and 80 parts silica sol that contained 30% of the silica sol as colloidal silica of 15 millimicrons diameter.

Firing was on the carbon plate at about 3200° F. for about 30 minutes. The sample was cooled quickly upon discharge from the kiln and the carbon from the plate trimmed off. Cellulation was good at a density of 18 to 24 pounds per cubic foot.

EXAMPLE X

Samples of about 20 surface clays were collected from California, Georgia and Germany. All of these were tried along the lines of Example I, adding more or less to no sugar. All the specimens could be cellulated successfully.

Six commercial ball clays and a Georgia Kaolin were also formed on carbon plates and cellulated using the above procedure.

It will be obvious to those skilled in the art that many variations may be made in the embodiments here chosen for the purpose of illustrating the present invention and that full resort may be had to the doctrine of equivalents without departing from the scope of this invention as defined by the appended claims.

I claim:

1. Apparatus for firing of refractory raw material comprising:
    (a) A longitudinally disposed kiln having an entrance end and an exit end and having openings defining a front entrance port and a rear exit port for raw material passed through the interior of said kiln;
    (b) conveyor means in said interior for supporting and feeding said raw material from said entrance port along a prescribed generally linear path in the interior of said kiln and out of said exit port;
    (c) fuel burning means in the rear portion of said interior for firing said raw material as it passes there through;
    (d) baffle plates disposed generally horizontally in said interior for separating said interior into combustion chambers and a muffle chamber therebetween, said conveyor means being disposed in said muffle chamber;
    (e) exhaust means adjacent to the entrance and of said kiln for discharging the gases of combustion from said combustion chambers, whereby the heating gases discharged into the forward portion of said combustion chambers by said fuel burning means move rearwardly above and below said raw material in counterflow relationship;
    (f) delivery means for delivering said raw material into said entrance.

2. The apparatus defined in claim 1 wherein said muffle plates are formed of juxtaposed sheets of fused silica.

3. The apparatus defined in claim 1 wherein said delivery means includes a hopper for said raw material, said hopper having an opening in its bottom portion, a pair of opposed compression rollers disposed on opposite sides of said opening for feeding said raw material as a stream downwardly, a third compression roller below one of said opposed compression rollers, and guide means for guiding a surface of said stream from the other of said opposed compression rollers to said third compression roller, said opposed compression rollers compacting and feeding said raw material from said hopper into a stream fed in a downwardly direction and said third roller and said one of said opposed compression rollers cooperating to feed said stream as a ribbon of indeterminate length in a horizontal direction into said entrance port.

4. The apparatus defined in claim 3 wherein said guide means includes a curved sheet concentric with said one of said opposed compression rollers.

5. The apparatus defined in claim 1 including a plurality of nozzles disposed between said delivery means and said kiln for spraying material onto the surface of said raw material.

6. The apparatus defined in claim 1 wherein said fuel burning means includes a plurality of gas or oil burners disposed in staggered relationship in the opposite walls of said kiln.

7. An apparatus for feeding raw material as a ribbon in a horizontal direction comprising:
    (a) a hopper for said raw material, said hopper having an opening in its bottom portion, a pair of spaced transversally opposed compression rollers, the inner peripheries of which are disposed on opposite sides of said opening for engaging on opposite sides and compressing therebetween and progressively feeding said raw material as a stream downwardly;
    (b) a third compression roller below said one of said opposed compression rollers, and guide means for guiding a surface of said stream from the other of said opposed compression rollers to the upper periphery to said third compression roller;
    (c) said opposed compression rollers compacting and feeding said raw material from said hopper into a stream fed in a downward direction; and
    (d) said third compression roller and said one of said opposed compression rollers cooperating to compact and feed said stream as a ribbon of indeterminate length in a horizontal direction.

8. The apparatus defined in claim 7 wherein said guide means includes a curved sheet concentric with said one of said opposed compression rollers.

9. The apparatus defined in claim 8 including end rollers at the ends of said opposed compression rollers.

10. A kiln for firing refractory raw material comprising:
    (a) a longitudinally disposed kiln having an interior and aligned entrance opening and an exit to opening for said kiln;
    (b) a roller hearth within said interior;
    (c) a ram means adjacent to said entrance opening for ramming successive pans of charge into said pan so that one pan urges the next along said roller hearth toward said exit opening,
    (d) driven discharge rollers within the end portion of said kiln for discharging the endmost pan from said kiln through said exit opening; and
    (e) means for detecting when said end most pan is on said discharge rollers and for thereafter actuating said rollers.

11. The apparatus defined in claim 10 wherein said driven rollers are free to rotate when not being driven.

* * * * *